US012555917B2

(12) United States Patent
Suh et al.

(10) Patent No.: US 12,555,917 B2
(45) Date of Patent: Feb. 17, 2026

(54) RADIO FREQUENCY INTERFERENCE (RFI) SHIELDED SUBSTRATE-INTEGRATED-WAVEGUIDE (SIW) CAVITY ANTENNA

(71) Applicant: Intel Corporation, Santa Clara, CA (US)

(72) Inventors: Seong-Youp John Suh, Portland, OR (US); Tae Young Yang, Portland, OR (US); Kwan Ho Lee, San Jose, CA (US); Dong-Ho Han, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 921 days.

(21) Appl. No.: 17/547,858

(22) Filed: Dec. 10, 2021

(65) Prior Publication Data

US 2023/0187839 A1 Jun. 15, 2023

(51) Int. Cl.
*H01Q 13/18* (2006.01)
*H01P 3/12* (2006.01)
*H01Q 9/04* (2006.01)

(52) U.S. Cl.
CPC ............. *H01Q 13/18* (2013.01); *H01P 3/121* (2013.01); *H01Q 9/0407* (2013.01)

(58) Field of Classification Search
CPC ............ H01Q 13/18; H01Q 9/30; H01Q 9/04; H01Q 9/0407
See application file for complete search history.

(56) References Cited

U.S. PATENT DOCUMENTS

| | | | | |
|---|---|---|---|---|
| 10,511,082 B2 | 12/2019 | Perez et al. | | |
| 2010/0182205 A1* | 7/2010 | Chiang | ................ | H01Q 1/2266 343/702 |
| 2020/0395680 A1* | 12/2020 | Kim | ....................... | H01Q 9/045 |

OTHER PUBLICATIONS

Yang Zhao, Zijun Zhang, and Zhenghe Feng, "A Dual-band Tunable Ultra-Thin Cavity Antenna," IEEE Antennas and wireless propagation letters, vol. 10, 2011.
Muhammad Usman Memon and Sungjoon Lim, "Frequency-Tunable Compact Antenna Using Quarter-Mode Substrate Integrated waveguide," IEEE Antennas and wireless propagation letters, vol. 14, 2015.
Tae-Young Yang, "Fundamental limits on antenna size for frequency and time domain applications," Ph.D dissertation, 2012.

* cited by examiner

*Primary Examiner* — Dameon E Levi
*Assistant Examiner* — David Andrew Kubera
(74) *Attorney, Agent, or Firm* — Banner & Witcoff, Ltd.

(57) ABSTRACT

A substrate integrated waveguide (SIW) cavity antenna is described that enables dual frequency and broadband operation, as well as enhanced protection from radio frequency interference (RFI) that may be present within an electronic device environment. The SIW cavity antenna includes a capacitively-coupled feed that is disposed within the volume of the SIW cavity antenna, which is enclosed on four sides via a set of electrically-conductive plates. The SIW cavity antenna radiates using the remaining two open sides as apertures. The SIW cavity antenna may include a meander line radiator to facilitate the operation of a second frequency band, as well as the use of a tuning stub to further enhance the impedance bandwidth.

20 Claims, 35 Drawing Sheets

200

100

100

200

200

200

200

200

200

RADIO FREQUENCY INTERFERENCE (RFI) SHIELDED SUBSTRATE-INTEGRATED-WAVEGUIDE (SIW) CAVITY ANTENNA

TECHNICAL FIELD

The disclosure described herein generally relates to substrate-integrated waveguide (SIW) cavity antennas and, in particular, to broadband SIW cavity antennas that implement radio frequency interference (RFI) shielding and facilitate dual frequency band operation.

BACKGROUND

Electronic devices commonly implement one or more antennas to facilitate wireless communications. However, the platform noise (such as RFI) present in such electronic devices causes significant impact on the wireless communications by decreasing the carrier-to-noise ratio (and also signal-to-noise ratio). Such RFI may be a particular concern for electronic devices that utilize emerging high-speed double data rate (DDR) memory technology. The existence of such platform noise delays time-to-market (TTM) and increases manufacturing costs. Thus, current antenna implementations in electronic devices are prone to performance degradation caused by platform RFI, and function inadequately as a result.

BRIEF DESCRIPTION OF THE DRAWINGS/FIGURES

The accompanying drawings, which are incorporated herein and form a part of the specification, illustrate the present disclosure and, together with the description, further serve to explain the principles and to enable a person skilled in the pertinent art to make and use the techniques discussed herein.

In the drawings, like reference characters generally refer to the same parts throughout the different views. The drawings are not necessarily to scale, emphasis instead generally being placed upon illustrating the principles of the disclosure. In the following description, reference is made to the following drawings, in which.

Figure 8A:
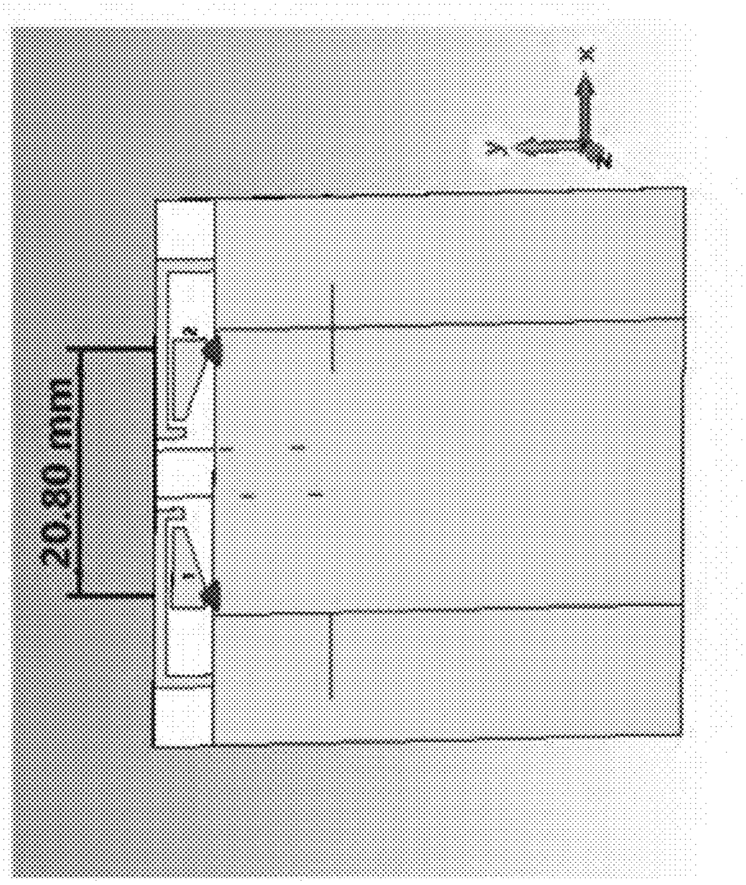
Figure 8B:
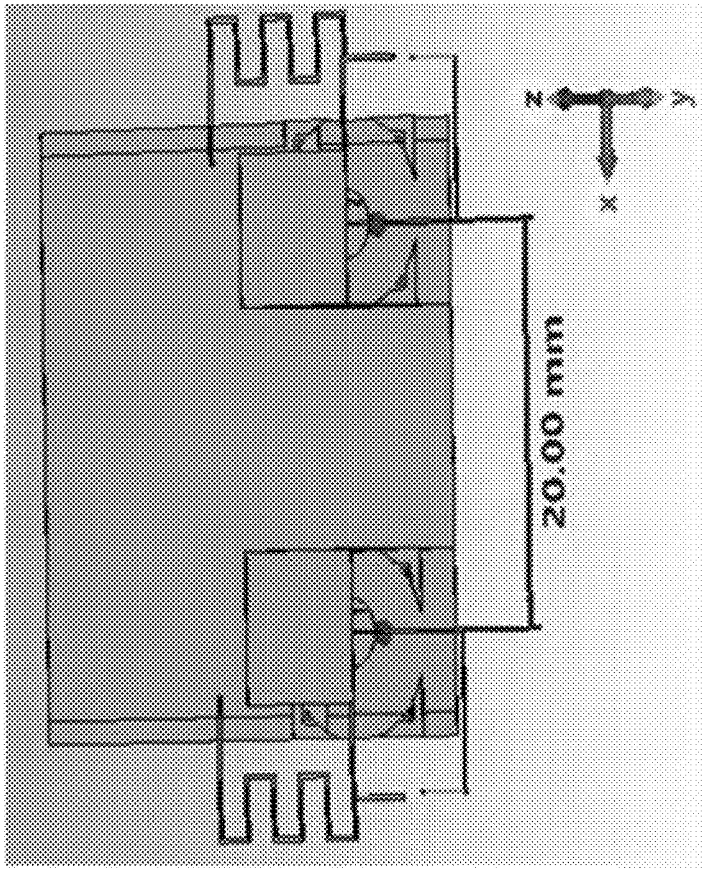

FIGS. 8A-8B illustrate a comparison between the use of conventional planar inverted F antennas (PIFAs) in free space with a shared ground plane in close proximity as part of a multiple-input multiple-output (MIMO) configuration versus the use of the SIW cavity antenna design 200 in free space with a shared ground plane in close proximity as part of a MIMO configuration, in accordance with the disclosure.

Figure 9:
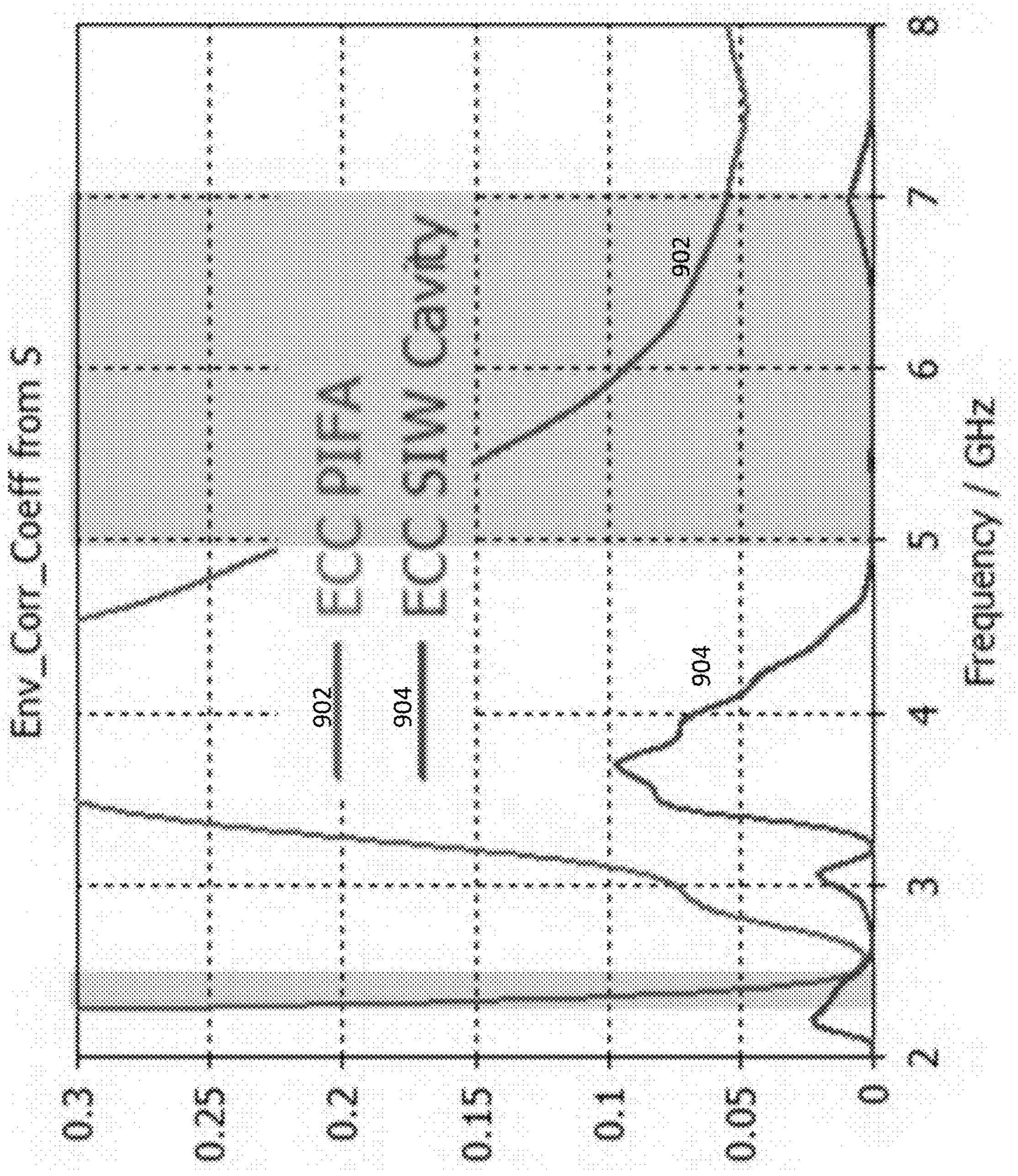

FIG. 9 illustrates a comparison between envelope correlation coefficients (ECCs) for each of the configurations as shown in FIGS. 8A-8B.

Figure 10:
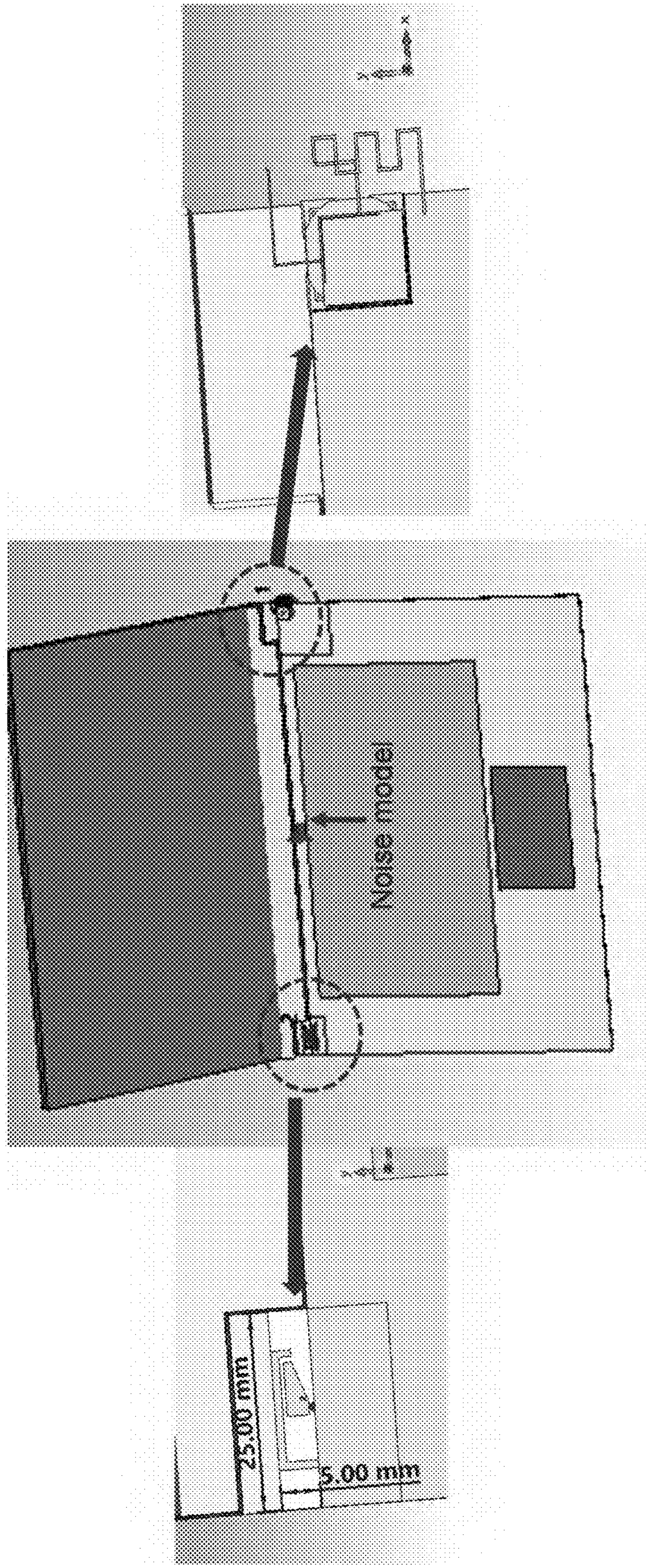

FIG. 10 illustrates a noise model configuration comparing the use of a conventional PIFA in a laptop versus the use of the SIW cavity antenna design 200, in accordance with the disclosure.

Figure 11A:
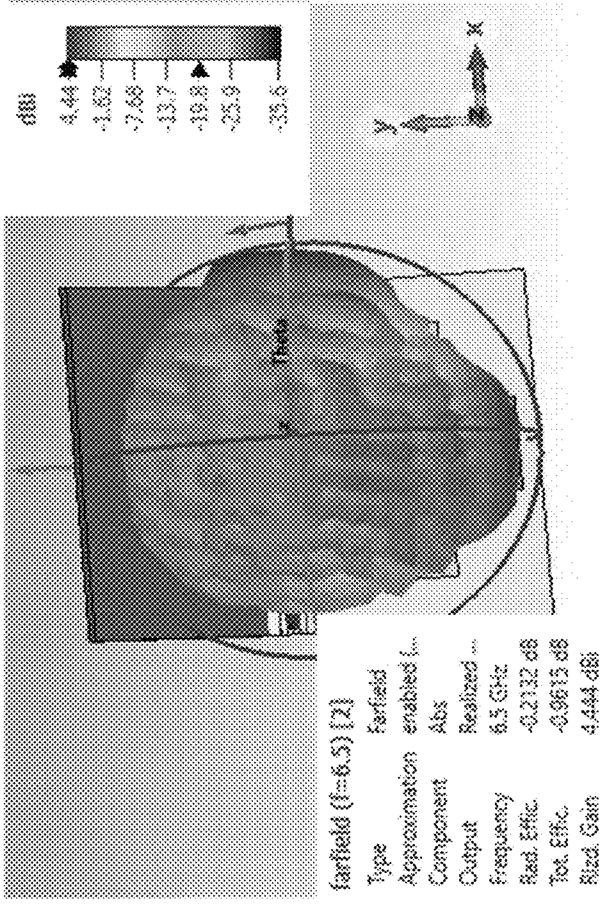
Figure 11B:
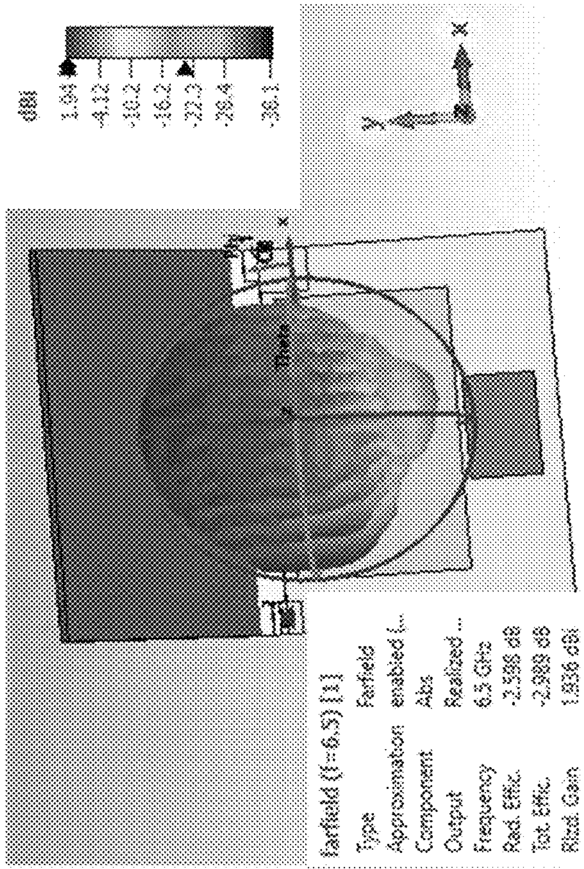

FIGS. 11A-11B illustrate a comparison in radiation patterns for the use of a conventional PIFA in a laptop versus the use of the SIW cavity antenna design 200, in accordance with the disclosure.

Figure 12B:
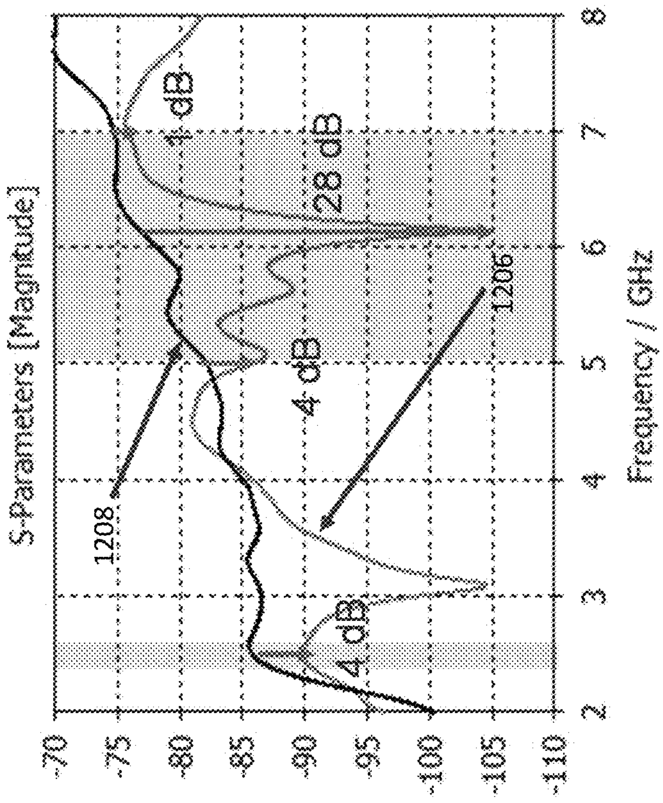
Figure 12A:
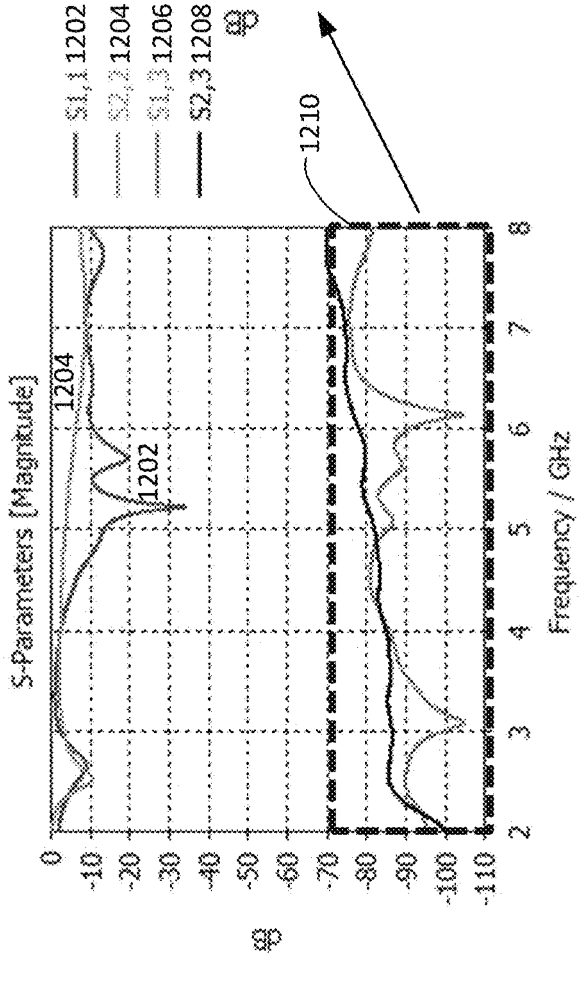

FIGS. 12A-12B illustrate graphs comparing the performance of a conventional PIFA in a laptop versus the use of the SIW cavity antenna design 200, in accordance with the disclosure.

Figure 13:
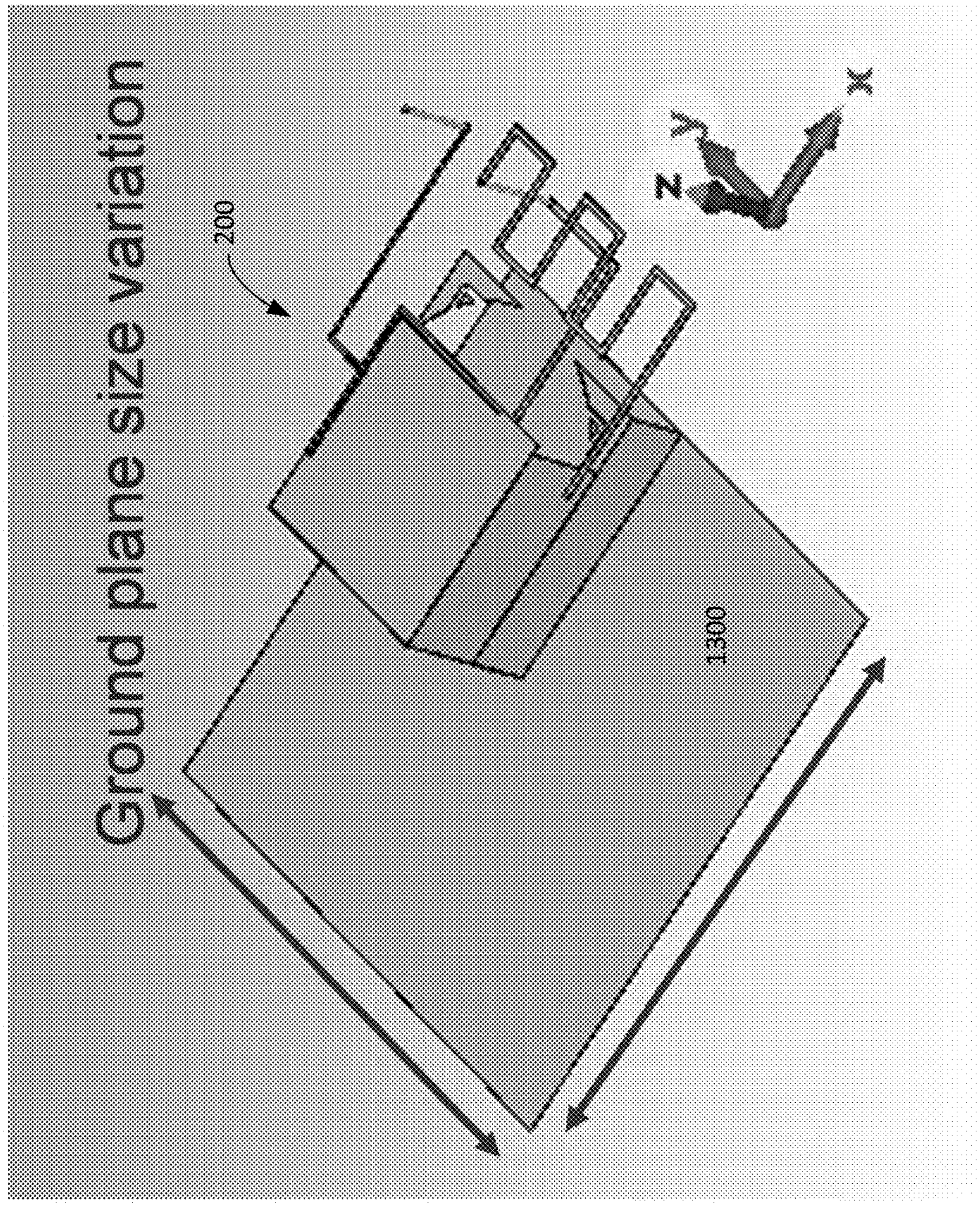

FIG. 13 illustrates placement of the SIW cavity antenna design on a ground plane that is varied in size to show robustness to ground plane size variations, in accordance with the disclosure.

Figure 14B:
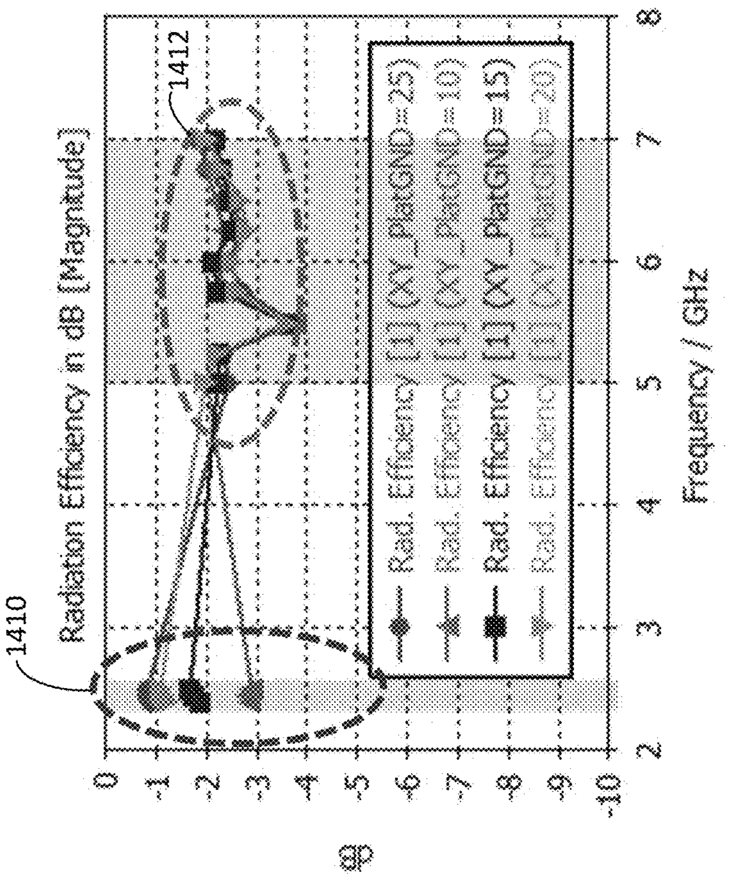
Figure 14A:
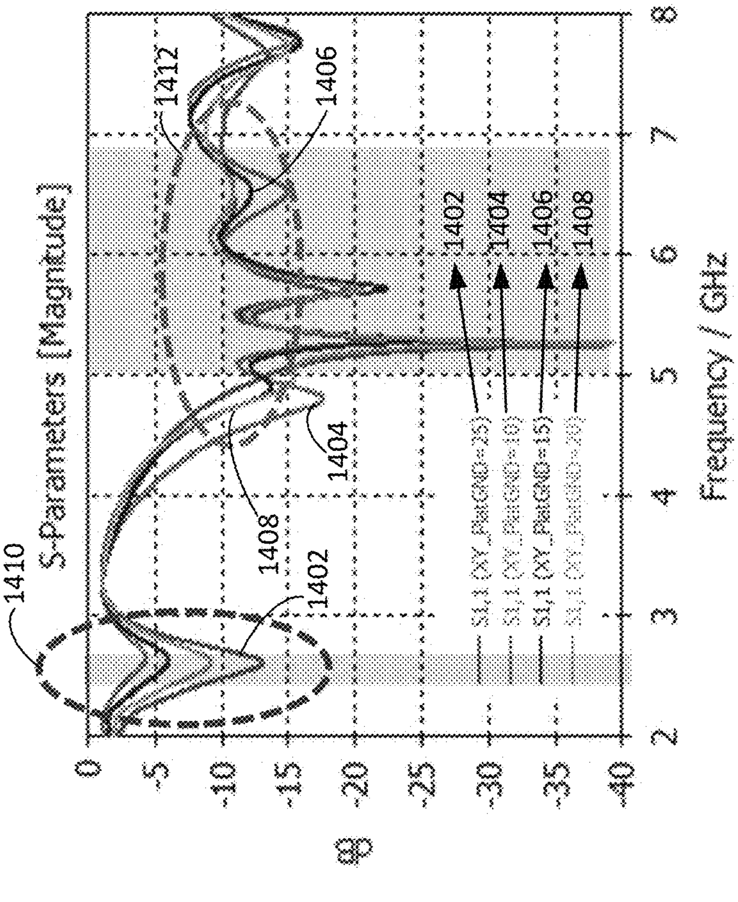

FIGS. 14A-14B illustrate simulated antenna performance metrics for variations of ground plane size as shown in FIG. 13, in accordance with the disclosure.

Figure 15B:
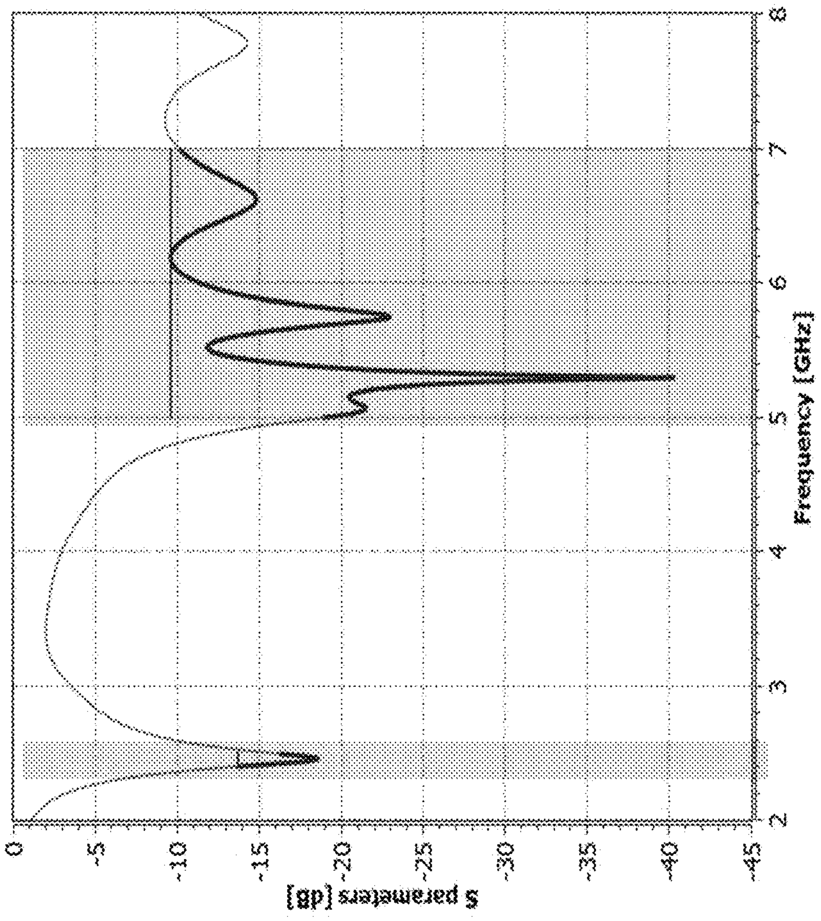
Figure 15A:
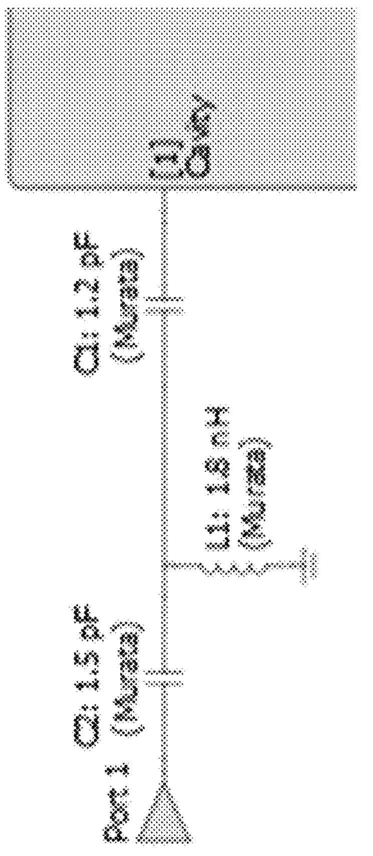

FIG. 15A illustrates an impedance matching device, in accordance with the disclosure.

FIG. 15B illustrates a reflection coefficient plot that represents a simulated result of using the impedance matching device as shown in FIG. 15A, in accordance with the disclosure.

Figure 16:
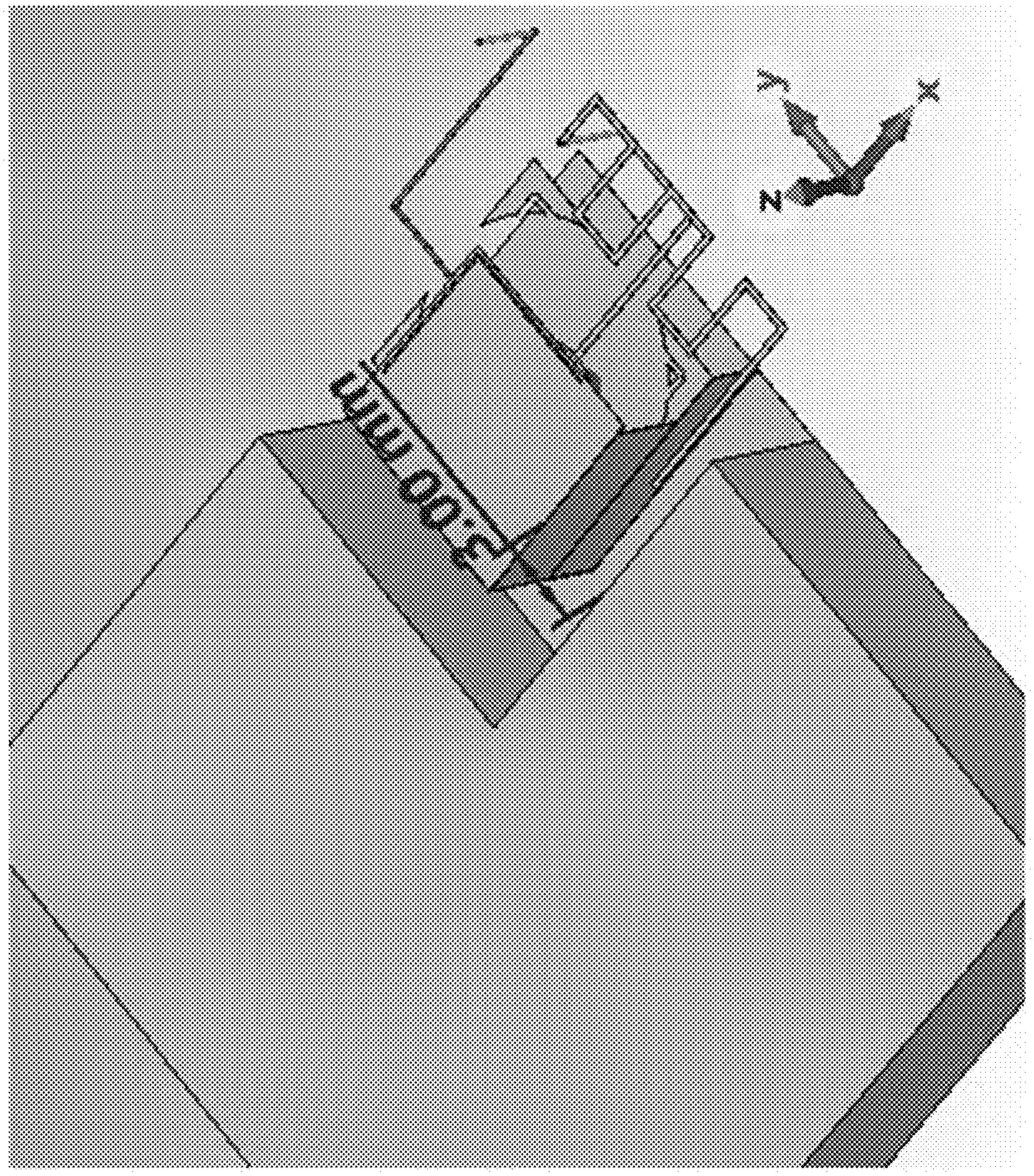

FIG. 16 illustrates the placement of the SIW cavity antenna design 200 in proximity to a metal structure to show robustness of antenna performance in such environments, in accordance with the disclosure.

Figure 17B:
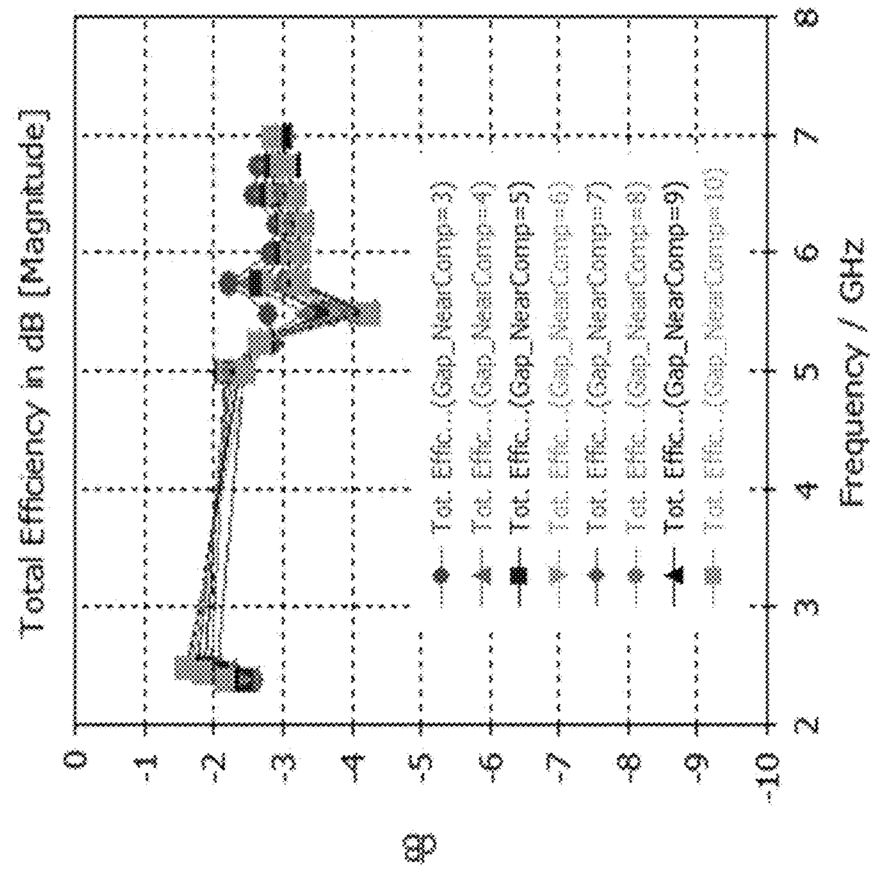
Figure 17A:
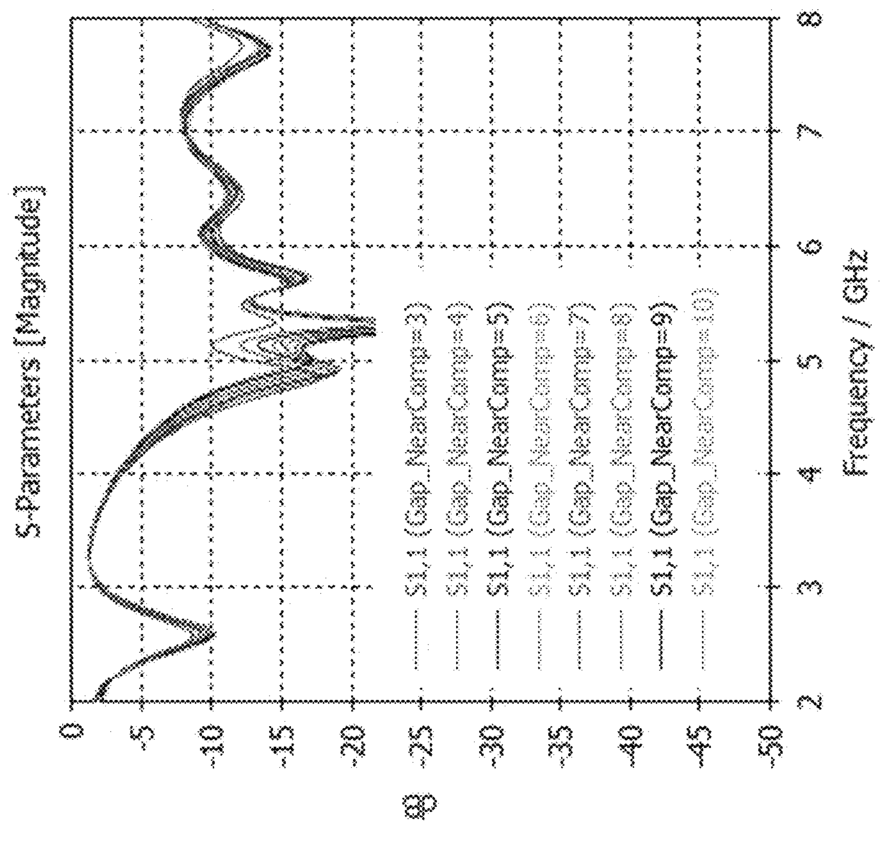

FIGS. 17A-17B illustrate simulated antenna performance metrics for varying distances of the metallic object as shown in FIG. 16, in accordance with the disclosure.

Figure 18:
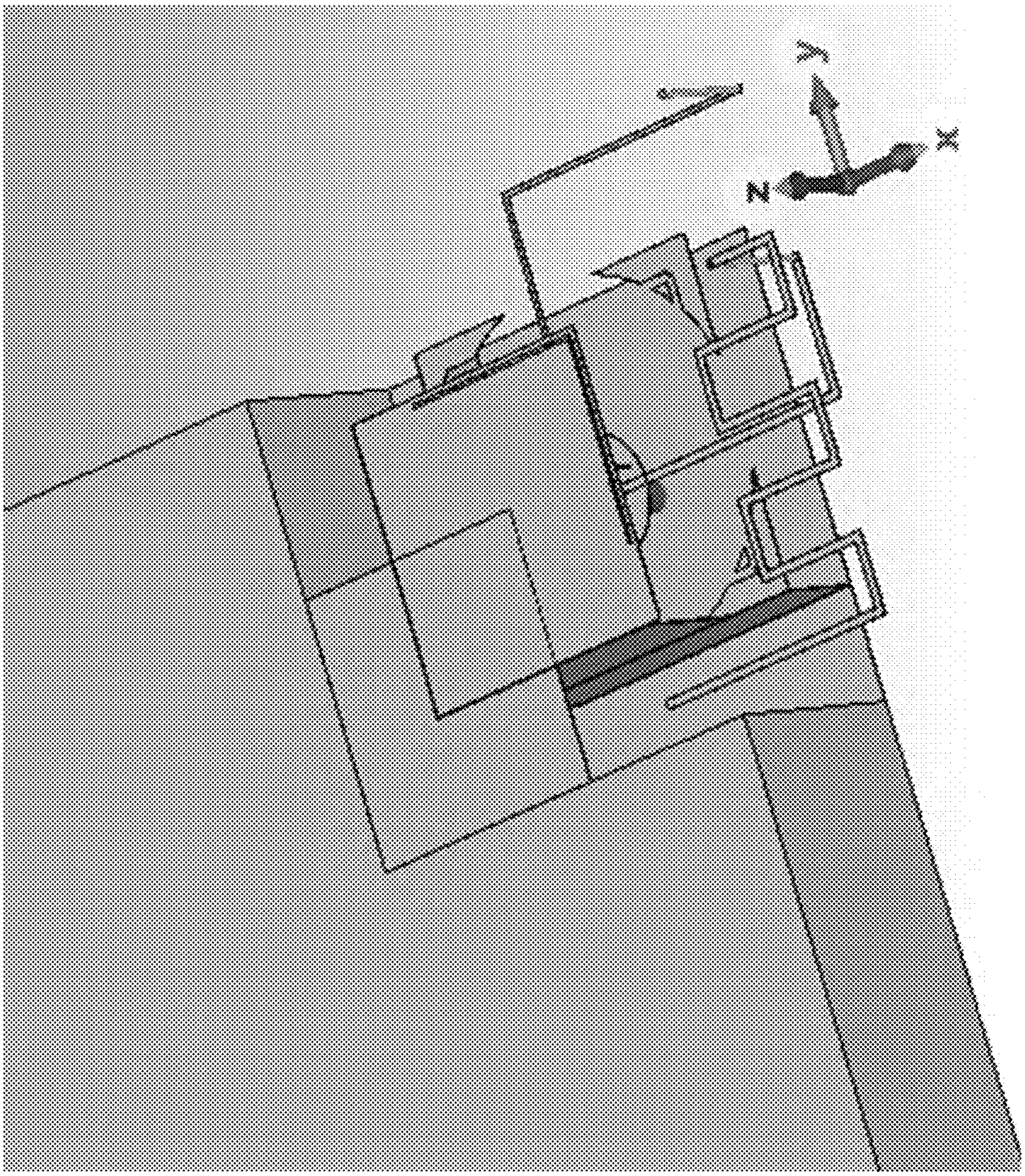

FIG. 18 illustrates the coupling of a portion of the SIW cavity antenna design 200 to a metal structure to show robustness of antenna performance in such environments, in accordance with the disclosure.

Figure 19A:
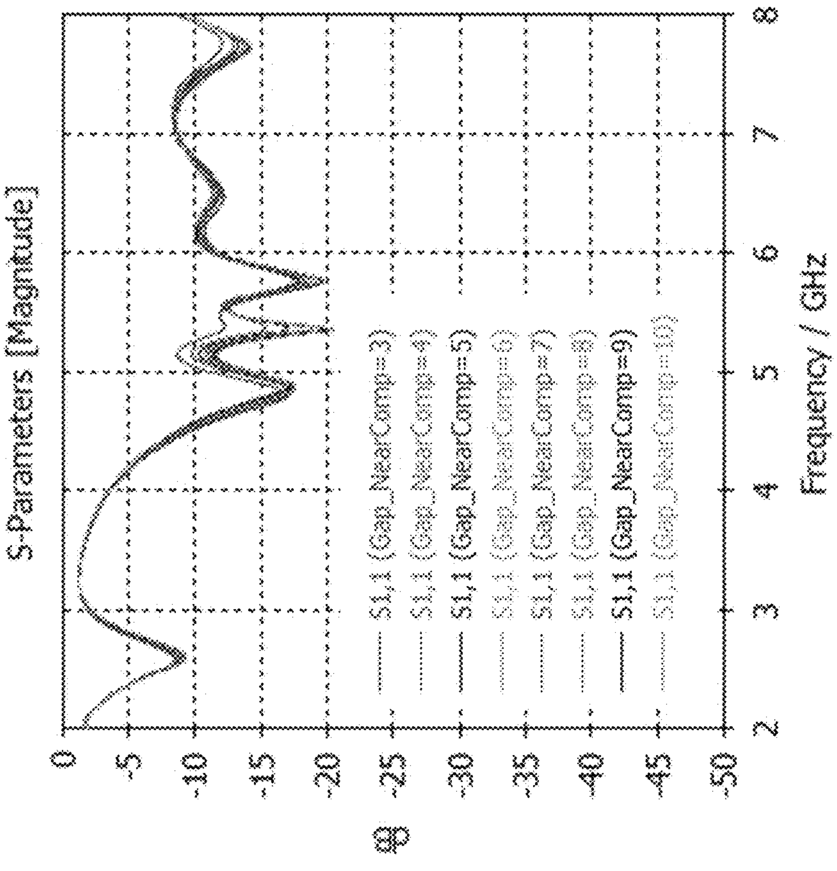
Figure 19B:
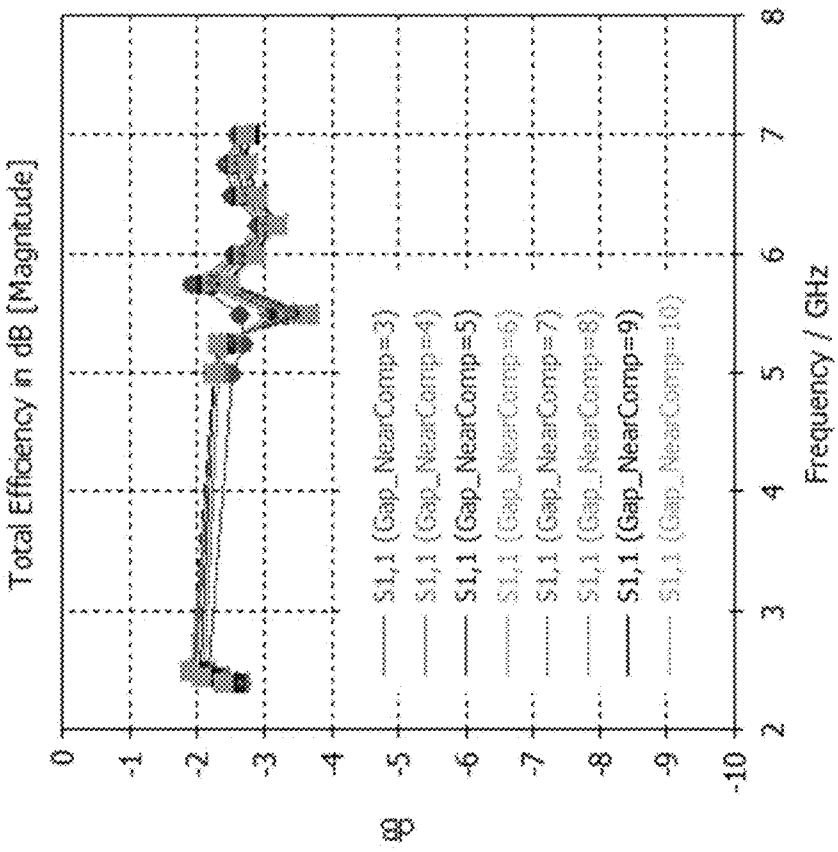

FIGS. 19A-19B illustrate simulated antenna performance metrics for varying distances to a metallic object while the SIW cavity antenna is coupled to a metallic object as shown in FIG. 18, in accordance with the disclosure.

Figure 20:
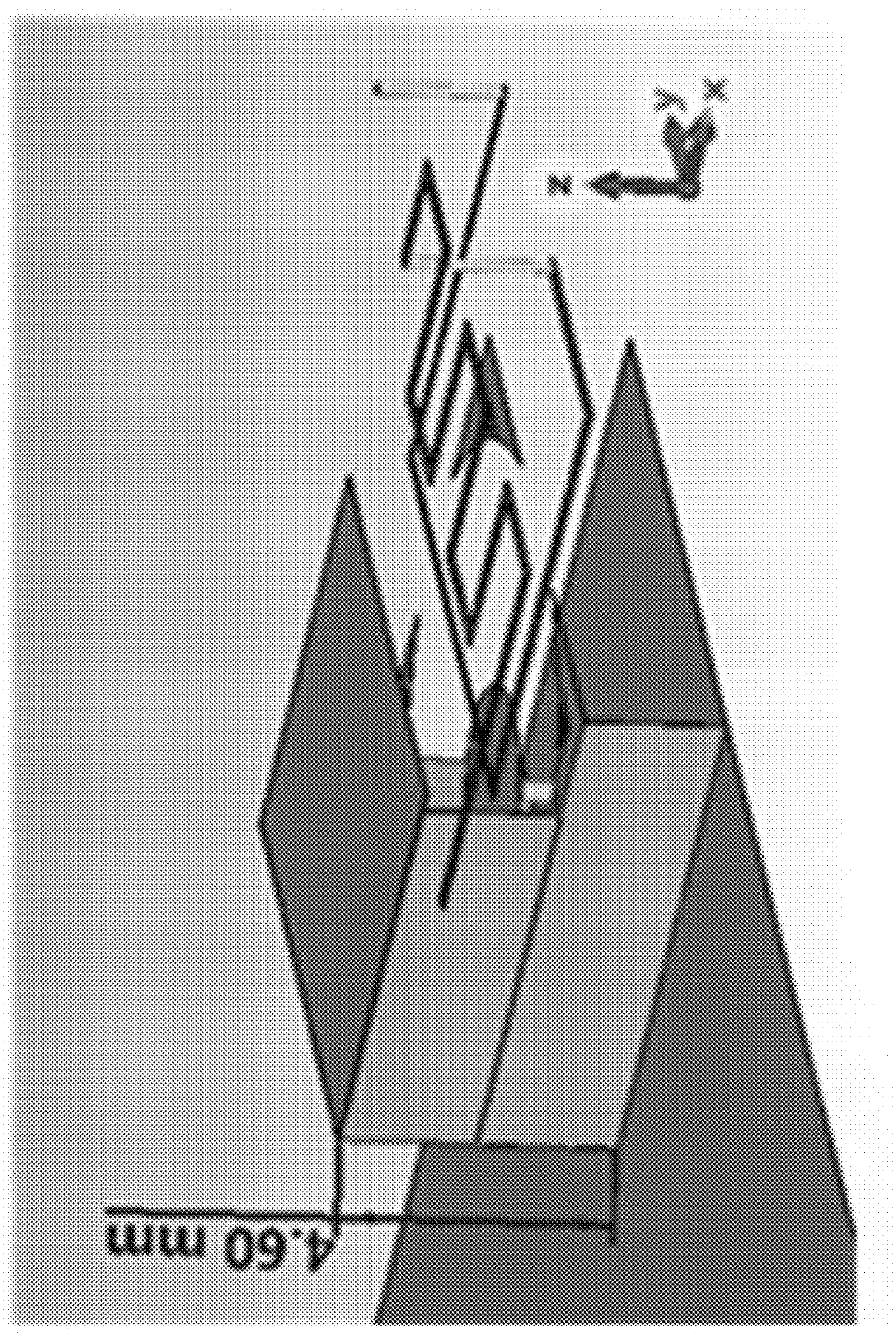

FIG. 20 illustrates a simulated SIW cavity antenna design having a reduced profile, in accordance with the disclosure.

Figure 21B:
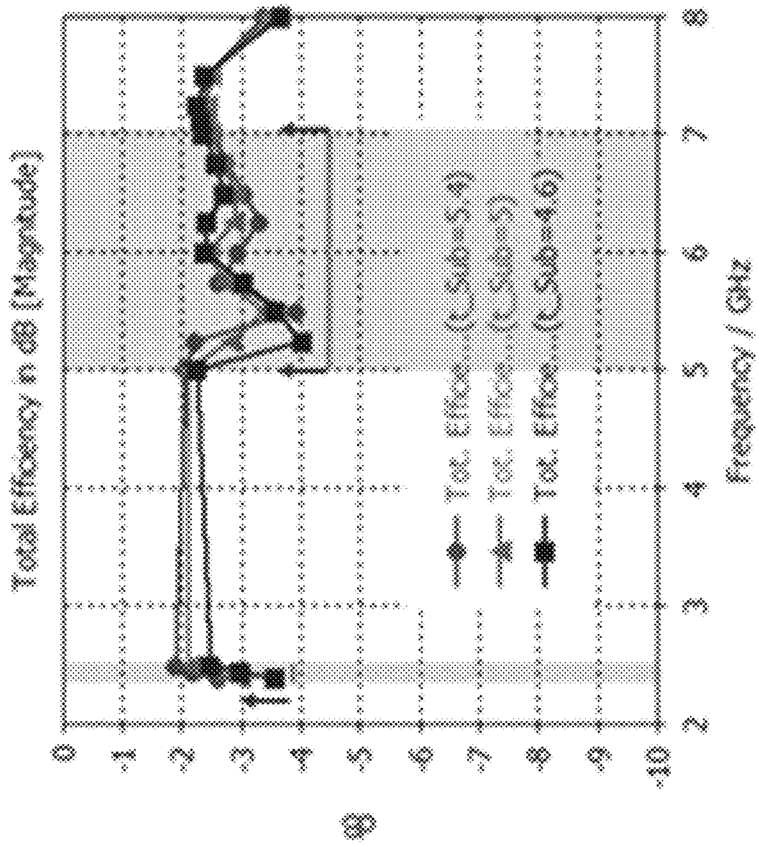
Figure 21A:
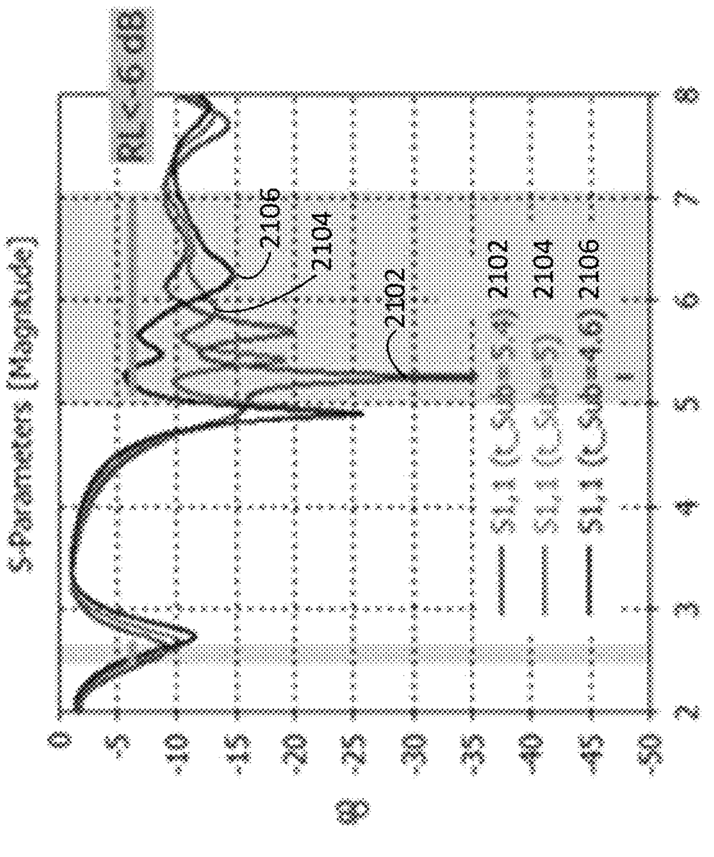

FIGS. 21A-21B illustrate changes in simulated antenna performance metrics caused by varying the height of the SIW cavity antenna as shown in FIG. 20, in accordance with the disclosure.

Figure 22:
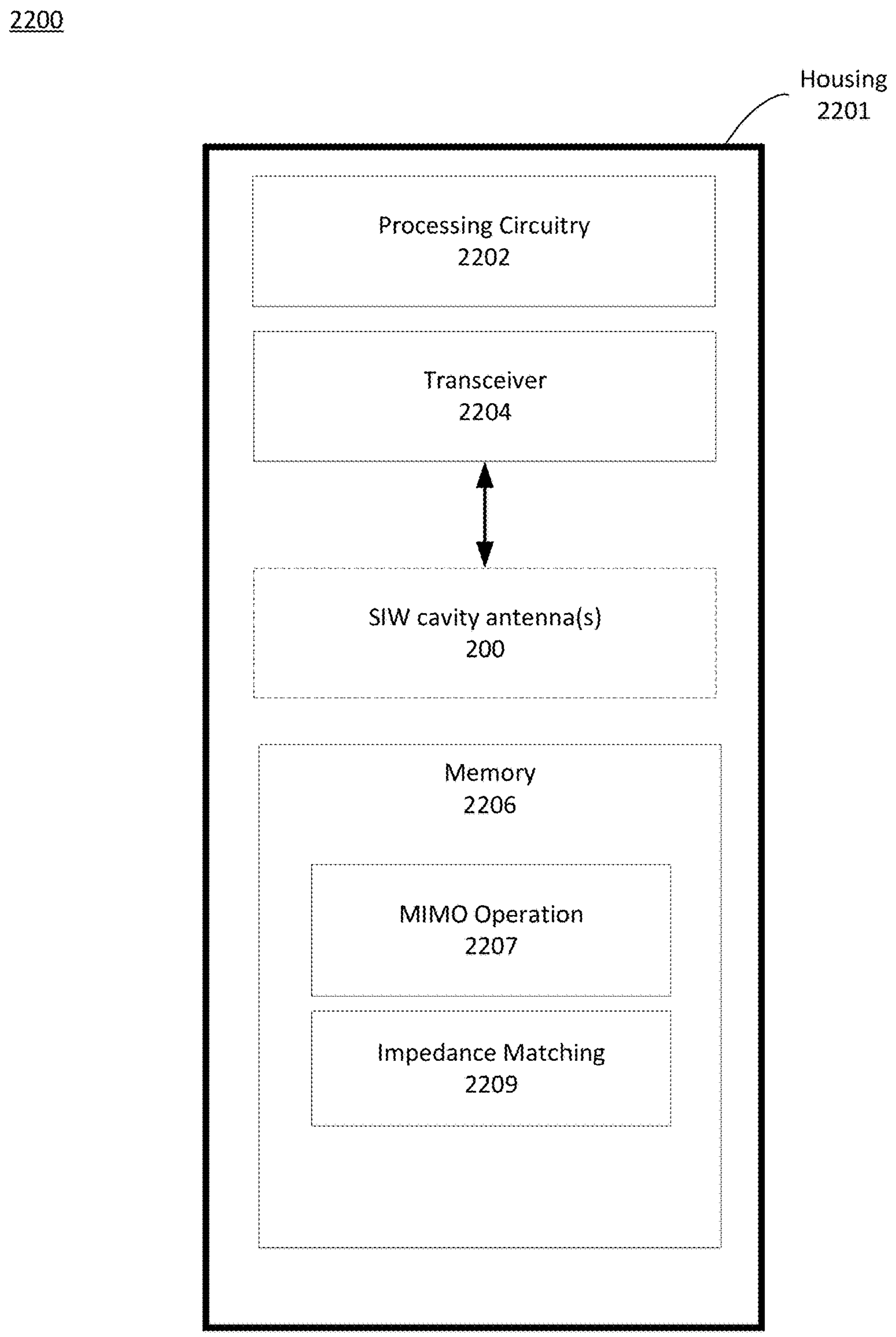

FIG. 22 illustrates an electronic device, in accordance with the disclosure.

The present disclosure will be described with reference to the accompanying drawings. The drawing in which an element first appears is typically indicated by the leftmost digit(s) in the corresponding reference number.

DETAILED DESCRIPTION

The following detailed description refers to the accompanying drawings that show, by way of illustration, exemplary details in which the disclosure may be practiced. In the following description, numerous specific details are set forth in order to provide a thorough understanding of the present disclosure. However, it will be apparent to those skilled in the art that the various designs, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring the disclosure.

Again, and as noted above, the platform noise in electronic devices causes significant impact on the wireless communications. Current solutions to mitigate platform noise include passive, reactive, and standard approaches. These approaches include placing antennas far from the noise sources, such as placing antennas in a laptop lid, which are then interconnected with long RF cables. However, such solutions introduce additional complexity and cost. Other existing solutions include shielding the noise sources with shielding "cans," although this is also an expensive solution that requires extra space and adds weight. Moreover, the excessive use of such shielding can introduce thermal issues and, particularly when a high-performance graphics processing unit (GPU) is in use, may introduce significant design challenges. Finally, typical mitigation solutions require printed circuit board (PCB) re-spins, which are implemented using extensive RFI debugging processes of the particular electronic device platform to mitigate noise prior to product launch due to FCC certification failures, malfunctions, etc., thus adding cost and time to production.

In addition to platform noise issues, conventional antenna performance is also impacted by placement locations as well as the materials proximate to the antennas within the electronic device. Antenna performance degradation is especially critical for broadband applications such as the Institute of Electrical and Electronics Engineers (IEEE) 802.11 Wi-Fi applications, which require customized tuning and modifications and thus increases antenna SKUs dramatically and causes additional TTM delay and costs. That is, the antennas used in electronic device platforms are designed to function in accordance with particular frequency bands to facilitate wireless communications, and typical solutions to attempt to ensure robust broadband antenna performance include the use of platform- and form factor-customized antenna designs, which increases SKUs, time-to-market (TTM), and cost. Moreover, current antenna solutions require an extensive debugging and tuning process. For instance, variations of locations and materials need to be considered for every different platform in which the antennas will be implemented. Thus, the current solutions to mitigate platform noise, to implement antenna designs to operate in the presence of such electronic device platform noise, and the customization of antennas on a per-platform basis are expensive, as current solutions often require the use of RF shielded cables, on-board shielding, and PCB re-spins.

Therefore, the designs described herein address these issues by providing an RFI-shielded substrate integrated waveguide (SIW) cavity antenna design. The proposed solution results in substantial benefits such as cost savings, high speed wireless performance, the removal of on-board shields, and the opportunity for form factor miniaturization. The designs described herein provide a scalable plug-n-play type solution that provide robust antenna performance that addresses the aforementioned issues with conventional antennas impacted by RFI, adjacent objects within an electronic device platform, and other parameters that may change between different platforms.

The antenna designs as discussed herein are illustrated as operating in accordance with specific bands that correspond to the 2.4 GHz and 5-7 GHz frequency bands, which may be implemented as part of the IEEE 802.11ax (Wi-Fi 6 and Wi-Fi 6E) standard published Feb. 21, 2021 and/or the IEEE 802.11be Wi-Fi (Wi-Fi 7), which is not yet released or otherwise published as of this writing. Thus, the designs described herein may be particularly useful for the implementation of antennas that provide broadband performance within the 2.4 GHz and 5-7 GHz frequency bands used for WiFi 6/6E/7 applications while offering built-in RFI mitigation solutions. However, the antenna designs as discussed herein are not limited to Wi-Fi frequencies or implementation in accordance with Wi-Fi communication standards, and may be implemented in accordance with any suitable number and/or type of frequencies, frequency bands, and/or communication protocols.

Thus, the SIW cavity antenna as further described herein offers a cost-effective and immediate solution to address the RFI challenges between wireless communications and RFI sources (such as high-speed DDR memory technology implementation) in electronic devices such as computing devices, laptops, desktops, etc., without causing additional thermal issues. Moreover, the described SIW cavity antenna design 200 provides a plug-and-play solution that is largely platform-agnostic, which provides a significant savings in both development cost and time to market by reducing engineering efforts and avoiding multiple design iterations based on adjacent structural modifications during the development cycle.

The SIW cavity antenna described herein is thus an excellent candidate for Wi-Fi antennas used in desktop PCs and workstations. In such implementations, Wi-Fi applications such as cloud gaming are increasingly important, but performance may be significantly impacted by DDR platform noises and many add-in cards (AICs). In such PC form factors, on-board EMI shields are not popular because of the use of 4-layer PCBs, but there remains ample space to accommodate the RFI shielded SIW cavity antenna design as further described below.

Figure 1A:
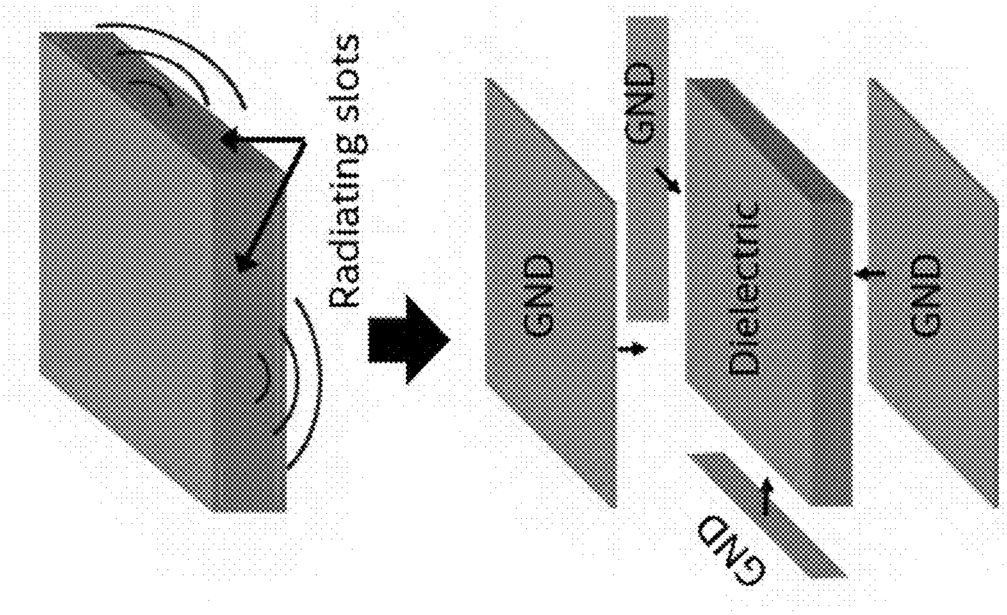
FIG. 1A prior art
FIGS. 1A-1D illustrate various views of a conventional substrate integrated waveguide (SIW) cavity antenna.
Figure 1B:
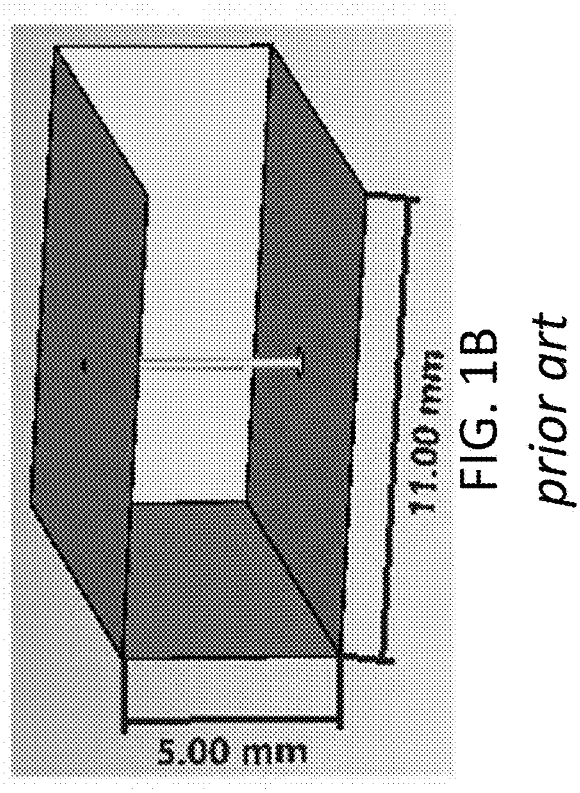
FIG. 1B prior art
Figure 1C:
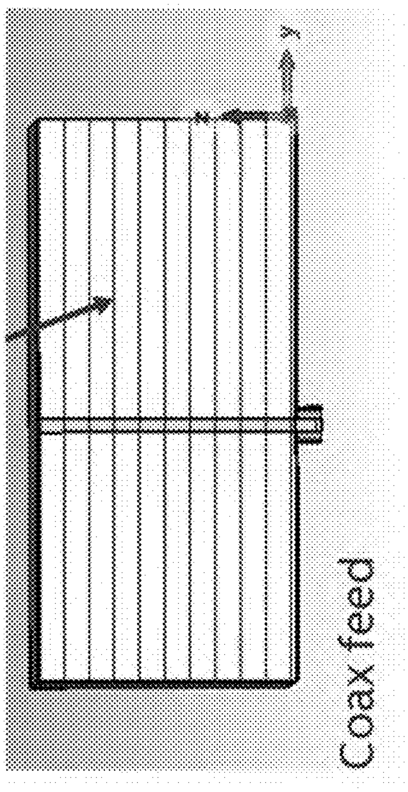
FIG. 1C prior art
Figure 1D:
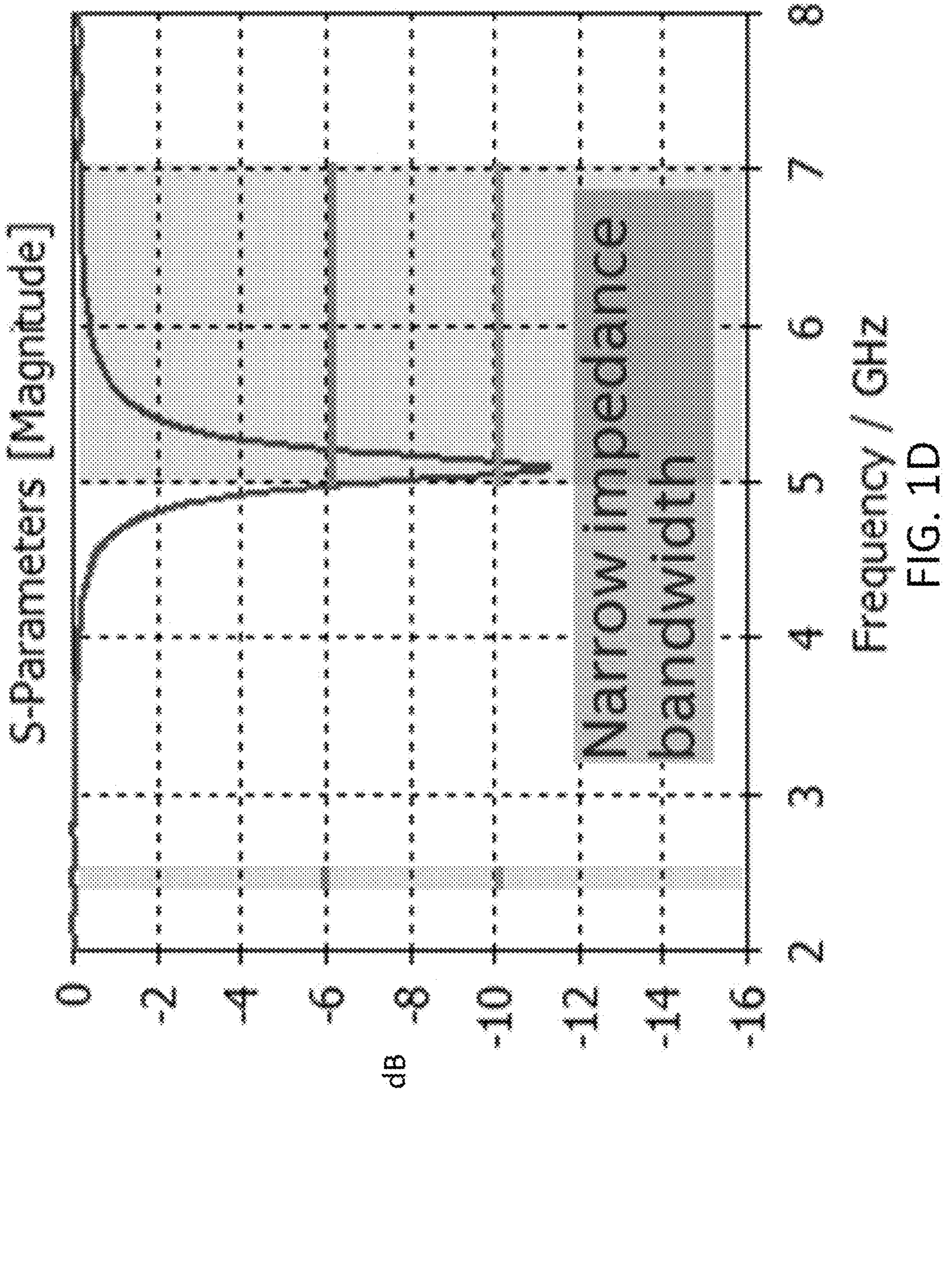
FIG. 1D prior art

FIGS. 1A-1D illustrate various views of a conventional substrate integrated waveguide (SIW) cavity antenna. As shown in FIGS. 1B-1C, conventional SIW cavity antennas have a monopole feed, which is electrically shorted to the upper ground plate metal structure. The feed excites the cavity formed from the upper and lower ground plate structures, as well as monopole ground plate structures. Depending on the x-y aspect ratio of the cavity and the location of the feed, a single resonance (such as at 2.4 GHz) may be created, or two separate resonances (such as at 2.4 GHz and 5.5 GHz), may be created. However, each of these resonances is relatively narrowband due to the high quality factor (Q) introduced by the electrically short SIW cavity antenna height. Thus, such conventional SIW cavity antenna structures cannot achieve a broadband frequency range, which is required for implementation of the emerging 5-7 GHz Wi-Fi band. This is illustrated in further detail in FIG. 1D, which shows a reflection coefficient plot over frequency for the conventional SIW cavity antenna illustrated in FIGS. 1B and 1C measured at the antenna feed.

FIGS. 2A-2K illustrate various view of a SIW cavity antenna, in accordance with the disclosure. The SIW cavity antenna design 200 as shown in FIGS. 2A-2K, which is discussed in further detail below, overcomes the narrow-banded issue of conventional SIW cavity antennas. This broadband impedance performance is achieved by way of a capacitively-coupled feed structure, which lowers the Q of the cavity, as well as the implementation of "continuous" multiple resonances to cover a 5-7 GHz bandwidth by "breaking" the geometric symmetries inside the cavity.

Figure 2A:
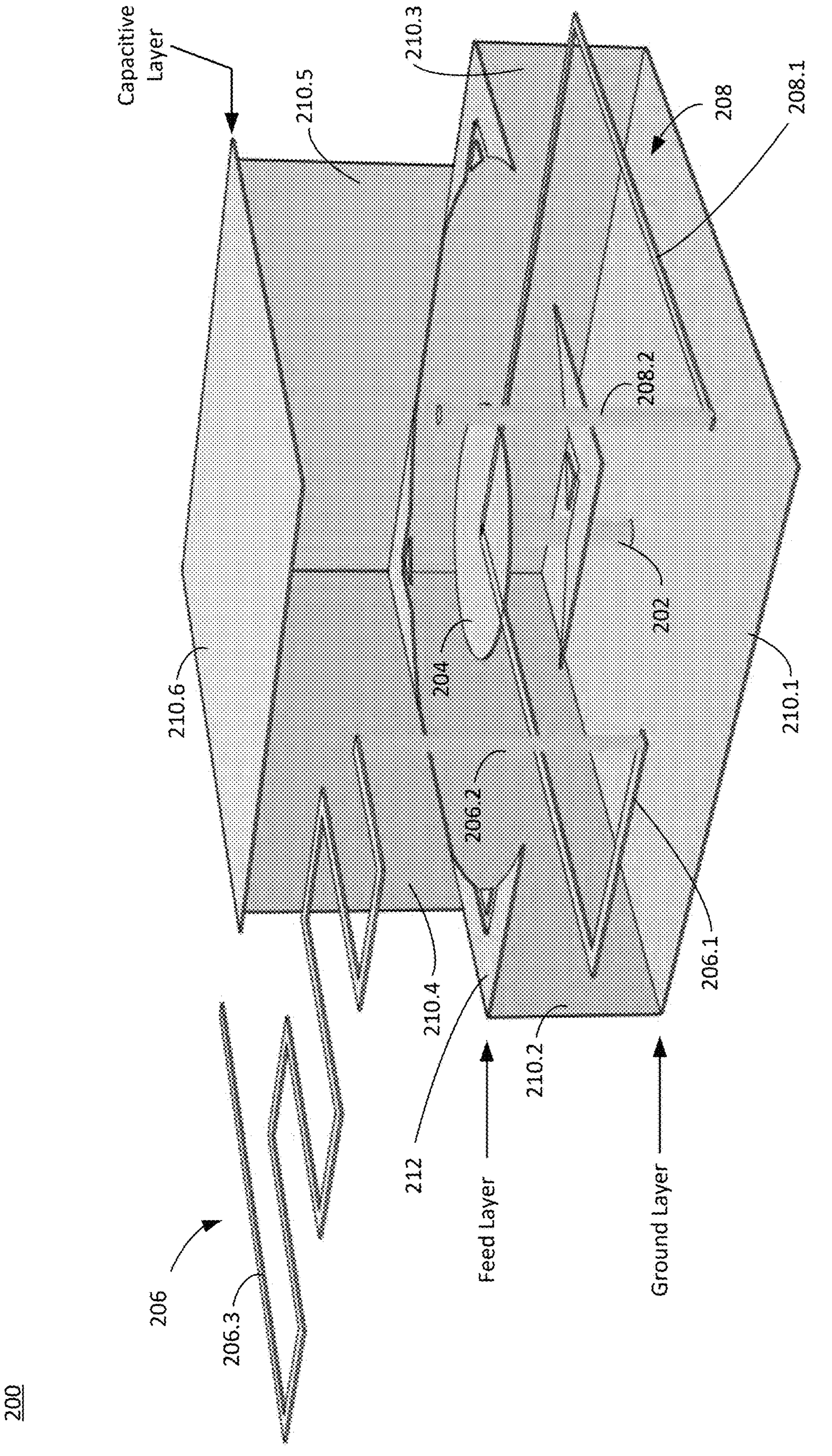
FIGS. 2A-2K illustrate various view of a SIW cavity antenna, in accordance with the disclosure.

Each of the FIGS. 2A-2K illustrates a different view of the SIW cavity antenna design 200 as discussed herein, with some views being illustrated by hiding particular substrate layers or other components for clarity and ease of explanation, as further discussed herein. Referring to FIG. 2A, which illustrates the SIW cavity antenna design 200 as a three-dimensional view, the SIW cavity antenna design 200 implements three layers, with each layer comprising various components that are disposed within that respective layer and are thus co-planar to one another. The SIW cavity antenna design 200 is shown in the Figures in a non-limiting sense, and may implement additional, alternate, or fewer components as those shown. Moreover, the SIW cavity antenna design 200 may implement components as discussed herein having different shapes, lengths, etc., which may facilitate the SIW cavity antenna design 200 operating in accordance with different frequencies, frequency bands, bandwidths, etc.

Furthermore, unless otherwise noted, the various components of the SIW cavity antenna design 200 may be implemented as any suitable type of electrically-conductive materials such as copper, brass, gold-plated metals, electrically-conductive alloys, etc., and the entirety of the SIW cavity antenna design 200 may be manufactured using any suitable type of manufacturing process such as etching, lithography, known PCB manufacturing techniques, etc. Thus, although not shown in the Figures for clarity and ease of explanation, the SIW cavity antenna design 200 may include a substrate of any suitable dielectric value between each of the layers. The electrically-conductive materials as shown in the Figures may be bonded to, etched from, deposited on, etc., the substrate materials. The substrate may be implemented as any suitable type of material such as an FR4 substrate commonly used for PCB fabrication, Benzocyclobutane, Bakelite, etc. Therefore, in one scenario the different layers of the SIW cavity antenna design 200 may be implemented as different layers of a multi-layered PCB.

With reference to FIG. 2A, the SIW cavity antenna design 200 comprises a ground layer that included an electrically-conductive lower plate 210.1 having a hole through which an antenna feed 202 passes, such that the lower plate 210.1 and the antenna feed 202 are electrically insulated from one another. The SIW cavity antenna design 200 also comprises a capacitive layer that includes an electrically-conductive upper plate 210.6. The SIW cavity antenna design 200 also comprises a plurality of electrically-conductive side plates 210.2, 210.3, 210.4, 210.5, which electrically couple the lower plate 210.1 and the upper plate 210.6 to one another. Thus, the lower plate 210.1, the upper plate 210.6, and each of the side plates 210.2, 210.3, 210.4, 210.5 form an electrically-conductive structure, which may represent an electrically continuous grounded structure forming a corner of the SIW cavity antenna design 200. The electrically-conductive structure is identified with four closed sides of the SIW cavity antenna design 200 (i.e. the top, bottom, and two sides as shown in FIG. 2A), which functions to shield the components within the volume formed by the cavity of the SIW cavity antenna design 200 from RFI that may be present on the other side of the electrically-conductive structure, as further discussed herein. The electrically conductive structure is also shown in further detail in FIG. 2D (with the upper plate 210.6 hidden and the feed 202 additionally shown for reference).

Thus, the structure of the SIW cavity antenna design 200 as shown in the Figures includes four closed sides and two open sides, which are used as the radiating apertures. The lower plate 210.1 is identified with a first closed side, the upper plate 210.6 is identified with a second closed side, the side plates 210.2, 210.3 are identified with a third closed side, and the side plates 210.4, 210.5 are identified with a fourth closed side. As shown in the Figures, the third closed side and the fourth closed side (i.e. the monopole sides as shown in FIG. 2A) are orthogonal to one another and to each of the first and the second sides, which are parallel with one another. Although each of the components of the electrically conductive structure (i.e. the lower plate 210.1, the side plates 210.2, 210.3, 210.4, 210.5, and the upper plate 210.6) are shown in the Figures as solid plates or sheets, this is a non-limiting scenario of implementation of the SIW cavity antenna design 200. One or more of the lower plate 210.1, the side plates 210.2, 210.3, 210.4, 210.5, and the upper plate 210.6 may alternatively be implemented as a series of rods, strips, lines, vias, etc., which may be sufficiently close to one another to function as equivalent solid sheet components at particular RF frequencies. Such an alternative implementation may be particularly useful for the implementation of the side plates 210.2, 210.3, 210.4, 210.5 as vias to simplify manufacturing.

The antenna feed 202 may be electrically coupled to any suitable antenna feed structure (not shown) identified with the platform (i.e. the electronic device) in which the SIW cavity antenna 200 is implemented, such as an inner conductor of a coaxial cable, a microstrip line, etc. Thus, the antenna feed 202 functions to electrically couple the SIW cavity antenna design 200 to any suitable type of transmitter, receiver, transceiver, etc. This enables the SIW cavity antenna design 200 may facilitate the electronic device in which it is implemented to transmit and/or receive signals via radiated and/or received electromagnetic energy, respectively, via the open sides of the SIW cavity antenna design 200.

Regardless of the particular implementation, the antenna feed 202 is electrically coupled to an electrically-conductive disk 204, which is disposed on a second layer of the SIW cavity antenna design 200, referred to herein as a feed layer. The Figures illustrate the feed 202 being coupled to the center of the disk 204. However, this is a non-limiting scenario, and the feed 202 may be coupled to the disk 204 at any suitable location, which may be varied as a tuning parameter based upon other adjustments to the components of the SIW cavity antenna design 200 and/or depending upon the particular frequencies and/or frequency bands of operation.

Thus, unlike the conventional SIW cavity antenna as noted above, the antenna feed 202 of the SIW cavity antenna design 200 is not directly connected to the upper plate 210.6, and is instead coupled to the disk 204, which is capacitively coupled to the upper plate 210.6 as depicted in FIG. 2A. Thus, the electrically-conductive disk 204 is electrically insulated from the upper plate 210.6 as well as the overall electrically-conductive structure formed by the lower plate 210.1, the upper plate 210.6, and each of the side plates 210.2, 210.3, 210.4, 210.5. The capacitive coupling in this manner creates a volumetric, spatially-distributed capacitance inside the cavity of the SIW cavity antenna design 200, which results in a broadening impedance bandwidth as a result of lowering the Q of the cavity resonance. This is achieved by way of the electrically-conductive disk 204 causing the excitation of multiple radiation modes, which enables a broad bandwidth inside the SIW cavity (i.e. the volume within the electrically-conductive structure including the lower plate 210.1, the upper plate 210.6, and the side plates 210.2, 210.3, 210.4, 210.5). Of course, the shape of the electrically-conductive disk 204 is shown in a non-limiting manner, and the electrically-conductive disk 204 may be of any suitable shape or include more than one disk (such as vertically-stacked (i.e. monopolely-stacked in the direction orthogonal to the upper plate 210.6) capacitively-coupled disks disks), or any other suitable shape.

To further reduce the Q of the cavity, distributed, inductive transmission lines are implemented. More specifically, to support a dual frequency band operation (such as the 2.4 GHz band and 5-7 GHz band, as discussed in further detail herein), two distributed, inductive transmission lines with different lengths are implemented within the cavity volume. That is, although the reduced Q achieved via the use of the capacitively-coupled disk 204 increases the impedance bandwidth of the SIW cavity antenna design 200, it is desirable to further increase the bandwidth for some applications, such as to cover the entire 5-7 GHz band as discussed herein. Thus, the geometric symmetry inside the cavity is "broken" by implementing distributed inductive transmission lines, thereby enabling "continuous" multiple resonances (or multiple cavity mode excitations) to cover a larger impedance bandwidth than would otherwise be possible.

The first of these distributed inductive transmission lines includes an impedance tuning stub 208, which is coupled to the disk 204 as shown in FIG. 2A. That is, the disk 204 functions as a terminal for impedance tuning stub 208 to tune the impedance of the SIW cavity antenna design 200, which may be particularly beneficial at higher frequencies (such as the 5-7 GHz frequency band as discussed herein, which may cover frequencies from 5.15 GHz-7.125 GHz in accordance with the Wi-Fi 6E standard). The impedance tuning stub 204 includes a segment 208.1 that is disposed within the feed plane, which again also includes the disk 204, and a segment 208.2 that is oriented vertically (i.e. monopolely) between the feed layer and the capacitive layer. The second segment 208.2 may be implemented as a via for this purpose. The length, width, shape, routing, etc. of the impedance tuning stub 204 and/or the segments 208.1, 208.2 may deviate from those shown in the Figures depending upon the particular frequencies and/or frequency bands of operation. Moreover, although the impedance tuning stub 208 is shown in the Figures as an open-circuited tuning stub, the impedance tuning stub 208 may alternatively be implemented as a short-circuited tuning stub (i.e. the end is coupled to one of the lower plate 210.1, the upper plate 210.6, the side plates 210.2, 210.3, 210.4, 210.5, etc.) in other applications, which may also impact the length of the impedance tuning stub 208.

The second of the distributed inductive transmission lines includes meander line monopole radiator 206, which is coupled to the disk 204 and is configured to enable the SIW cavity antenna design 200 to further transmit or receive electromagnetic energy in accordance with an additional frequency band. The meander line monopole radiator 206 includes a segment 206.1 that is disposed within the feed layer, a segment 206.2 that is oriented vertically (i.e. monopoley) between the feed layer and the capacitive layer, and a segment 206.3 that is disposed within the capacitive layer. The length, width, shape, routing, etc. of the meander line monopole radiator 206 and/or the segments 206.1, 206.2, 206.3 may deviate from those shown in the Figures depending upon the particular frequencies and/or frequency bands of operation. In the scenarios as discussed herein, the meander line monopole radiator 206 functions to enable the SIW cavity antenna design 200 to operate within the 2.4 GHz band (which may cover frequencies from 2.40-2.49 GHz in accordance with the Wi-Fi 6E standard) in addition to the 5-7 GHz band of operation for which the SIW cavity antenna 200 is otherwise designed to operate. That is, the SIW cavity antenna design 200 optionally includes the meander line monopole radiator 206 to support an additional frequency band of operation.

Regardless of the presence of the meander line monopole radiator 206, the SIW cavity antenna design 200 may support broadband operation in accordance with a primary frequency band, with the design further supporting dual band and broadband operation when the meander line monopole radiator 206 is present. In this way, when the meander line monopole radiator 206 is present, the SIW cavity antenna design 200 implements the disk 204 as a shared feed to excite two different radiating portions of the SIW cavity antenna design 200, one being the SIW cavity itself that enables operation (i.e. the transmission and reception of electromagnetic signals) over a first frequency band, and the other radiating portion being the meander line monopole radiator 206, which enables operation over a second frequency band.

Thus, and as shown in FIG. 2A, the impedance tuning stub 208 is coupled to the disk 204 at one location, whereas the meander line monopole radiator 206 is coupled to the disk 204 at another location. The location where each of the meander line monopole radiator 206 and the impedance tuning stub 208 are coupled to the disk 204 is shown in FIG. 2A at locations that are offset from one another by 90 degrees. However, this is a non-limiting scenario, and the coupling locations of the meander line monopole radiator 206 and the impedance tuning stub 208 to the disk 204 may be varied as a tuning parameter based upon other adjustments to the components of the SIW cavity antenna design 200 (such as the location of the disk 204 at which the feed 202 is coupled) and/or depending upon the particular frequencies and/or frequency bands of operation.

Figure 2B:
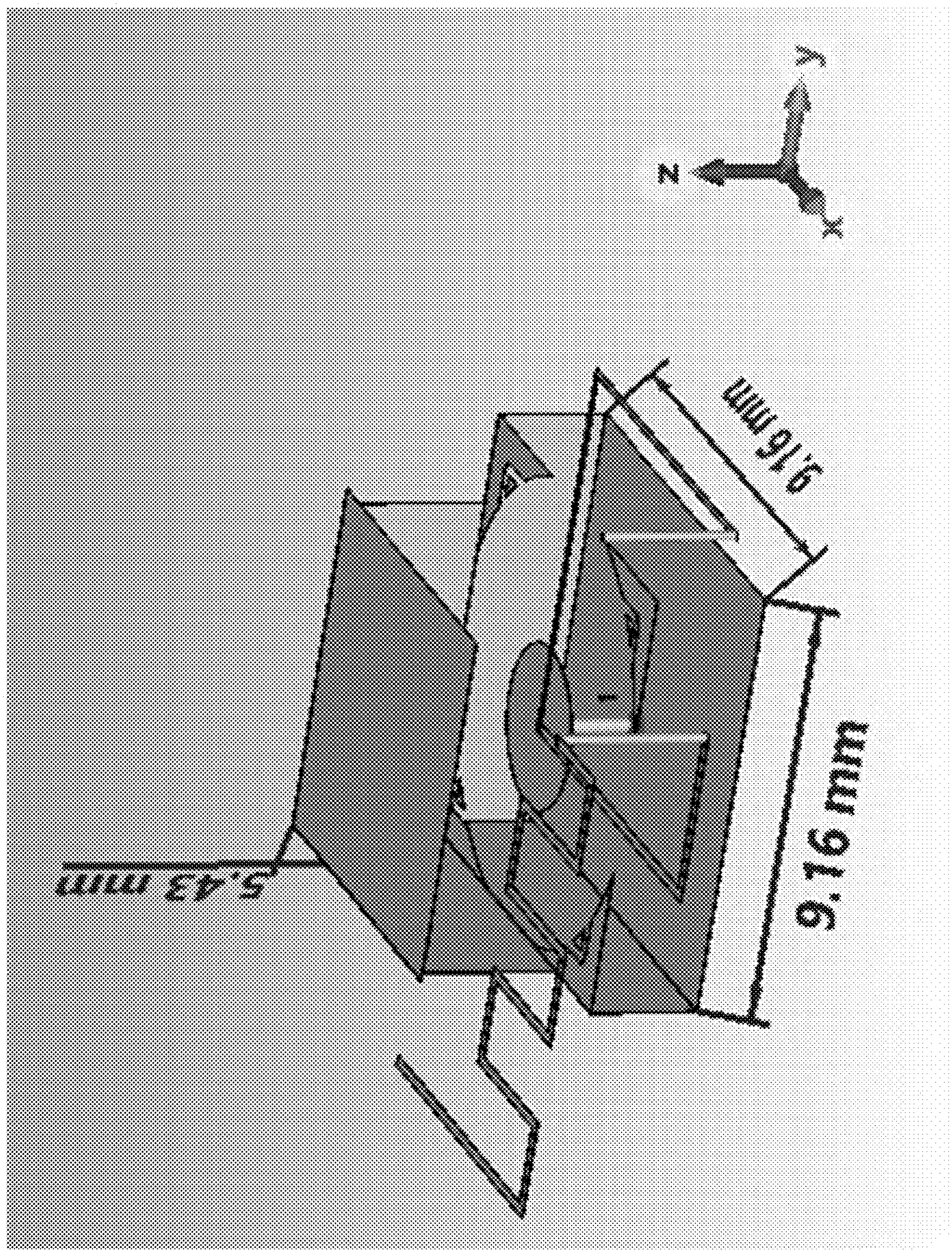
Figure 2C:
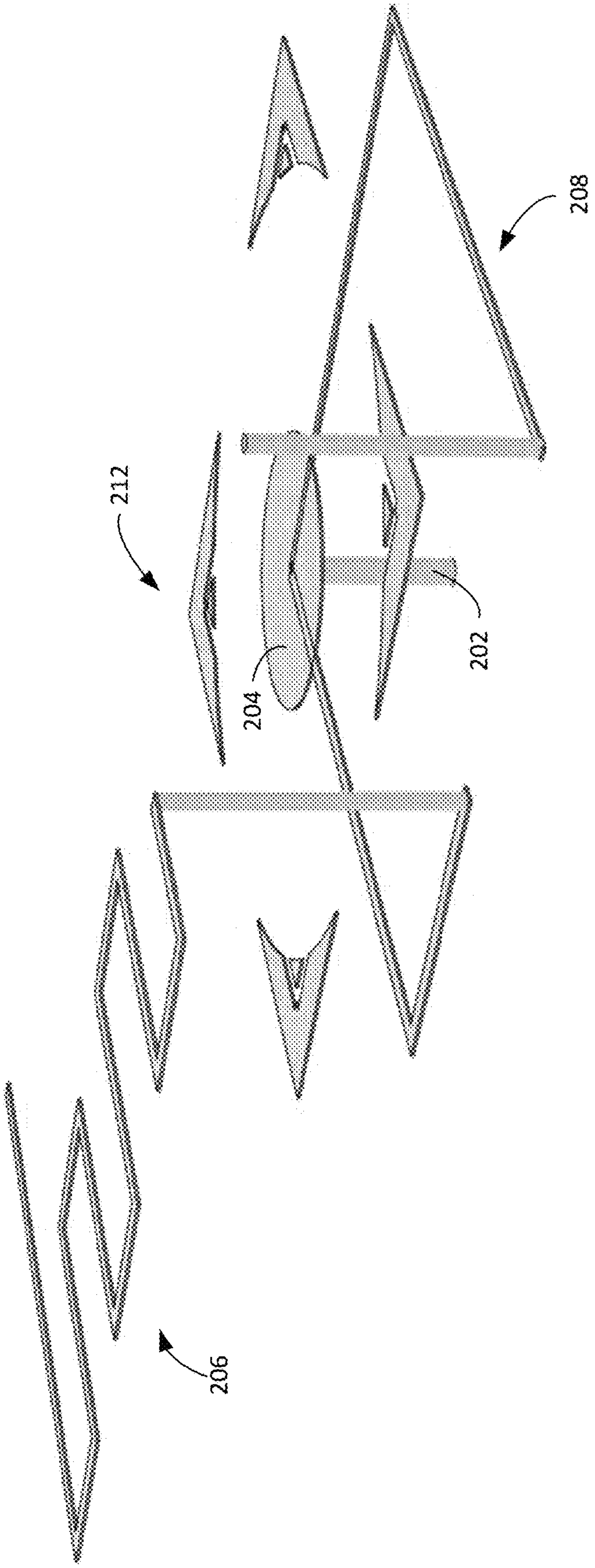
Figure 2D:
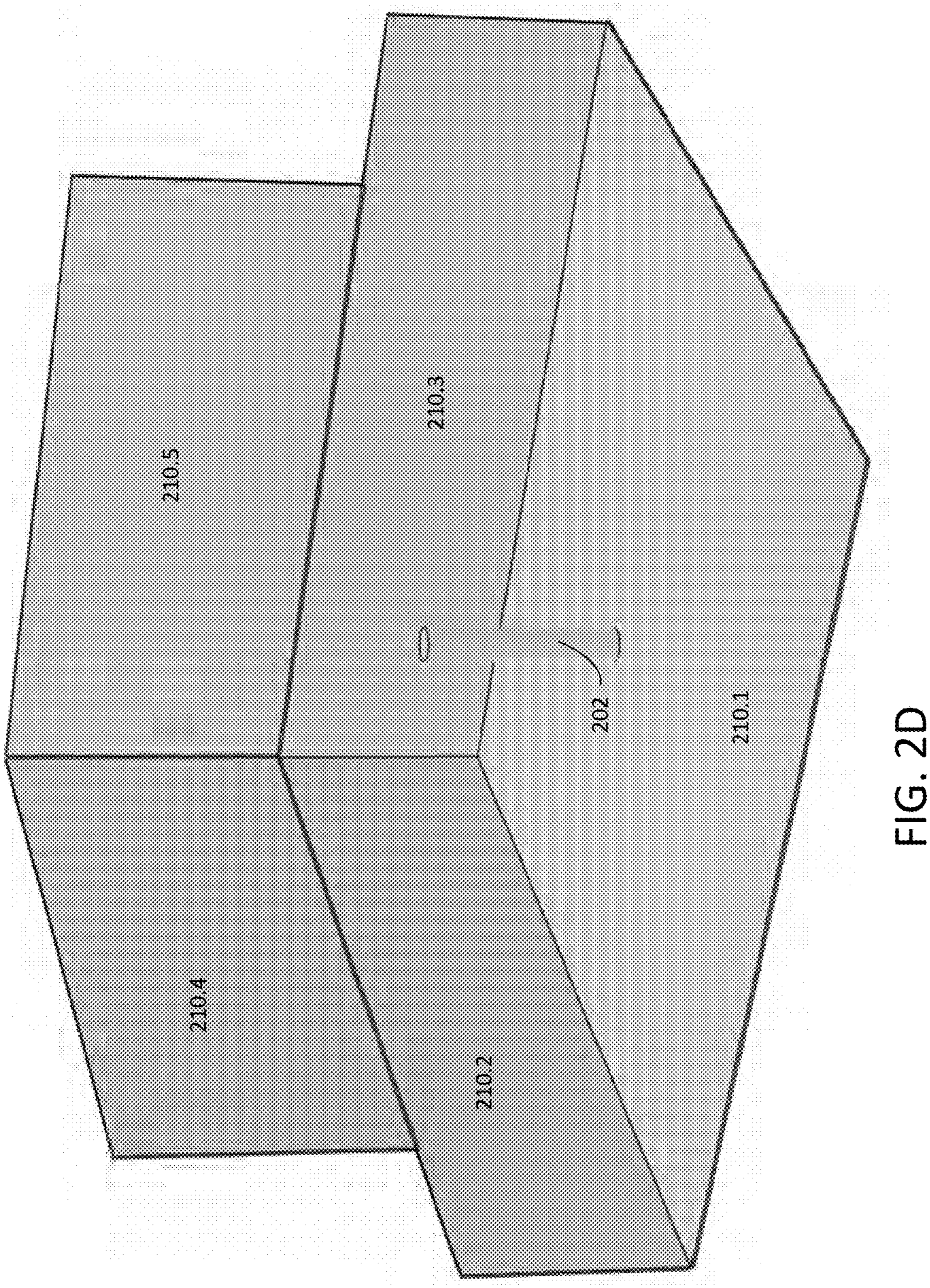
Figure 2E:
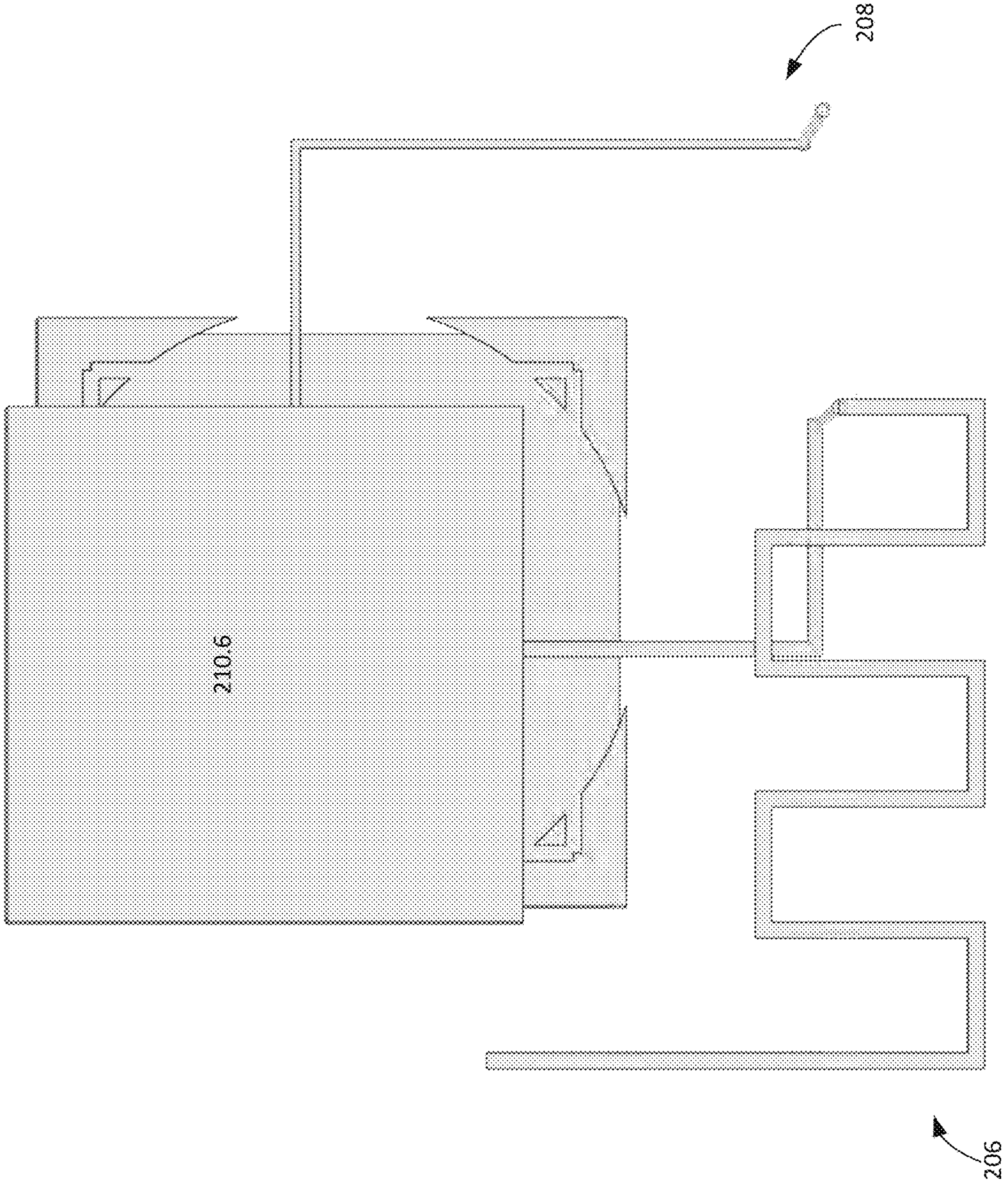
Figure 2F:
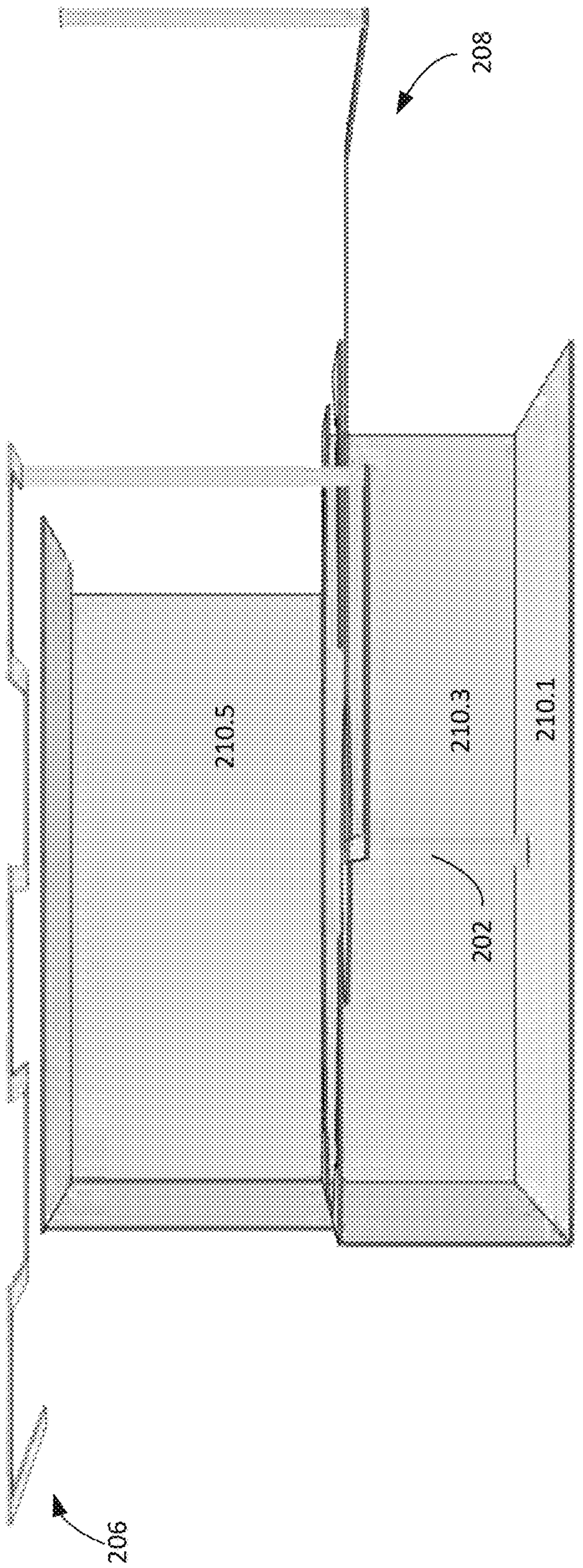
Figure 2G:
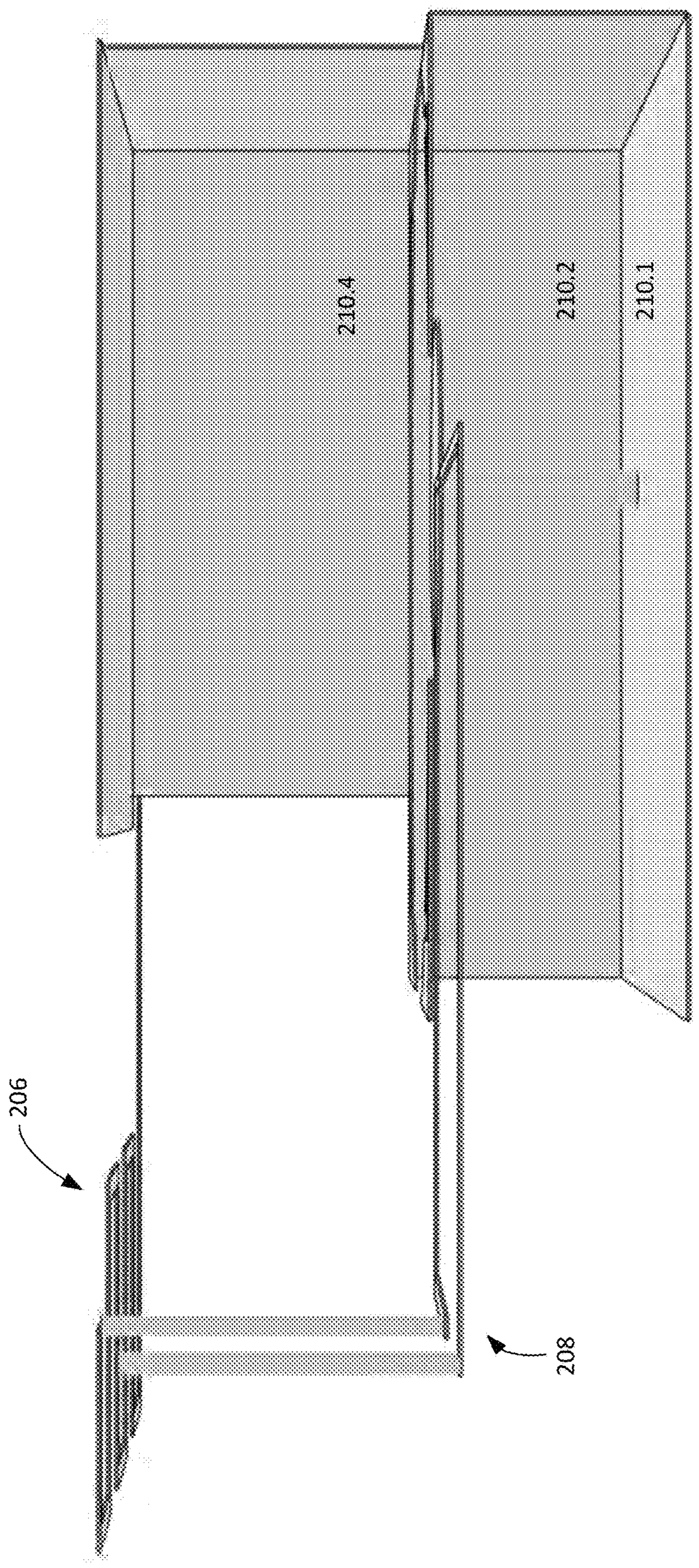
Figure 2H:
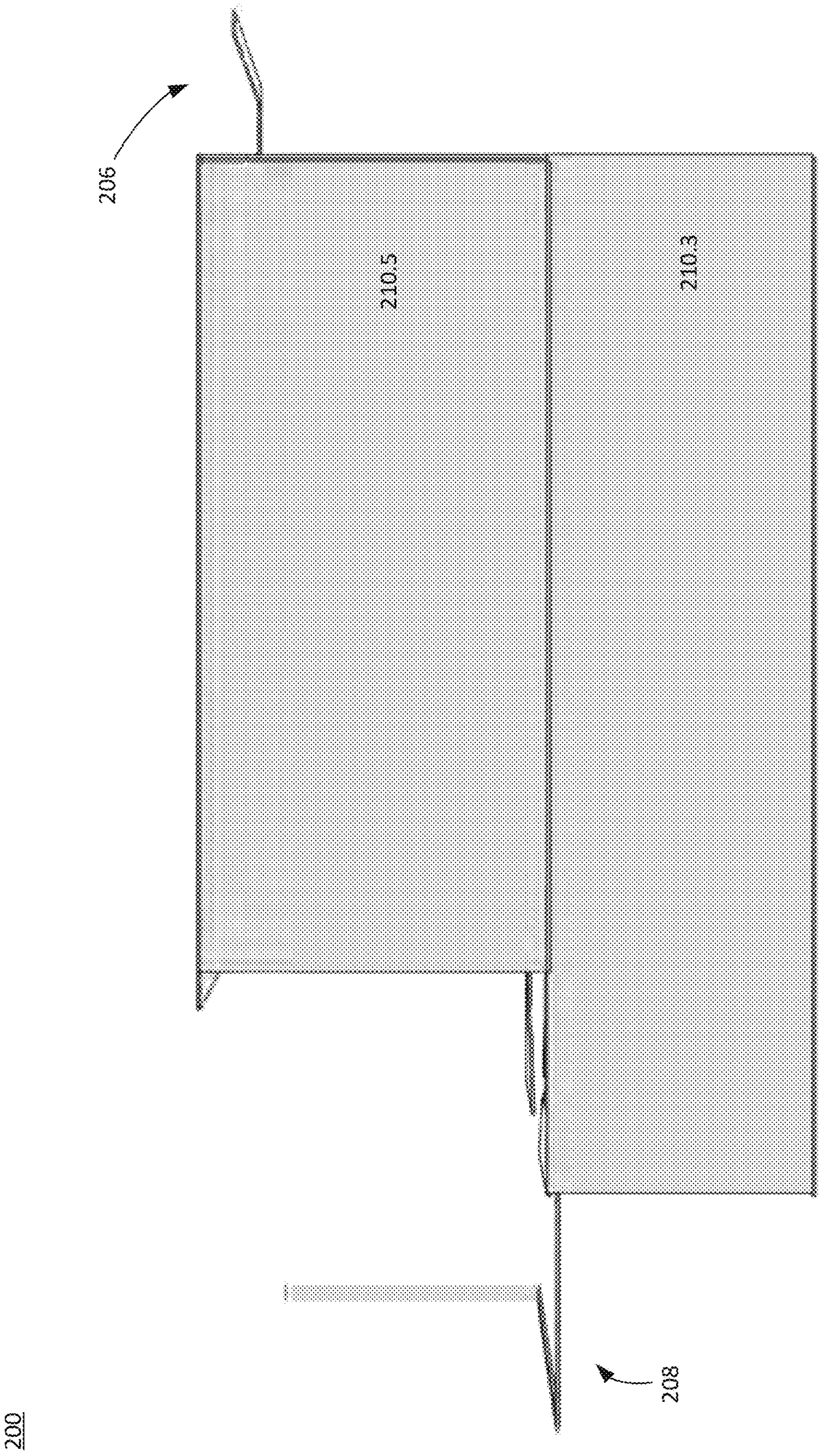
Figure 2I:
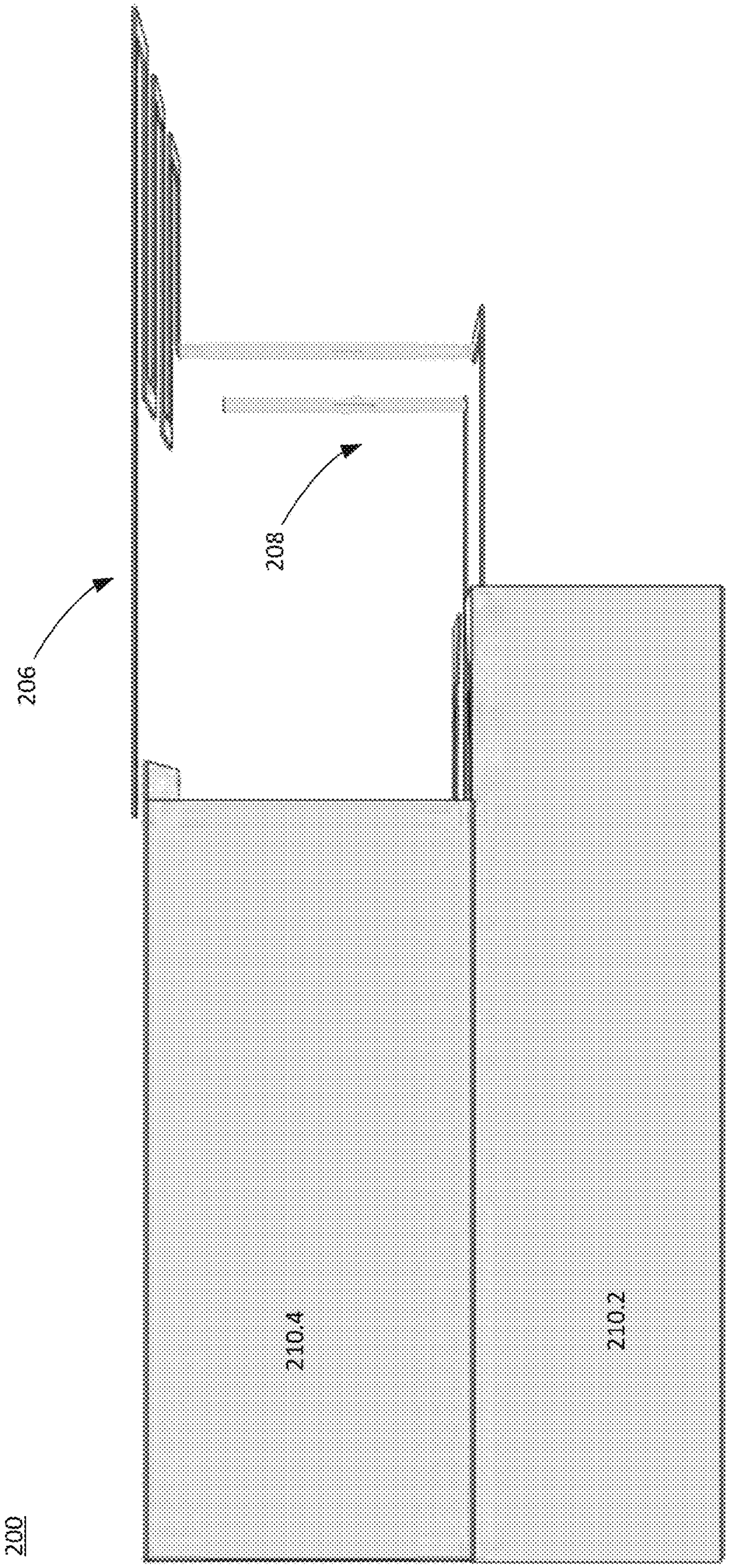
Figure 2J:
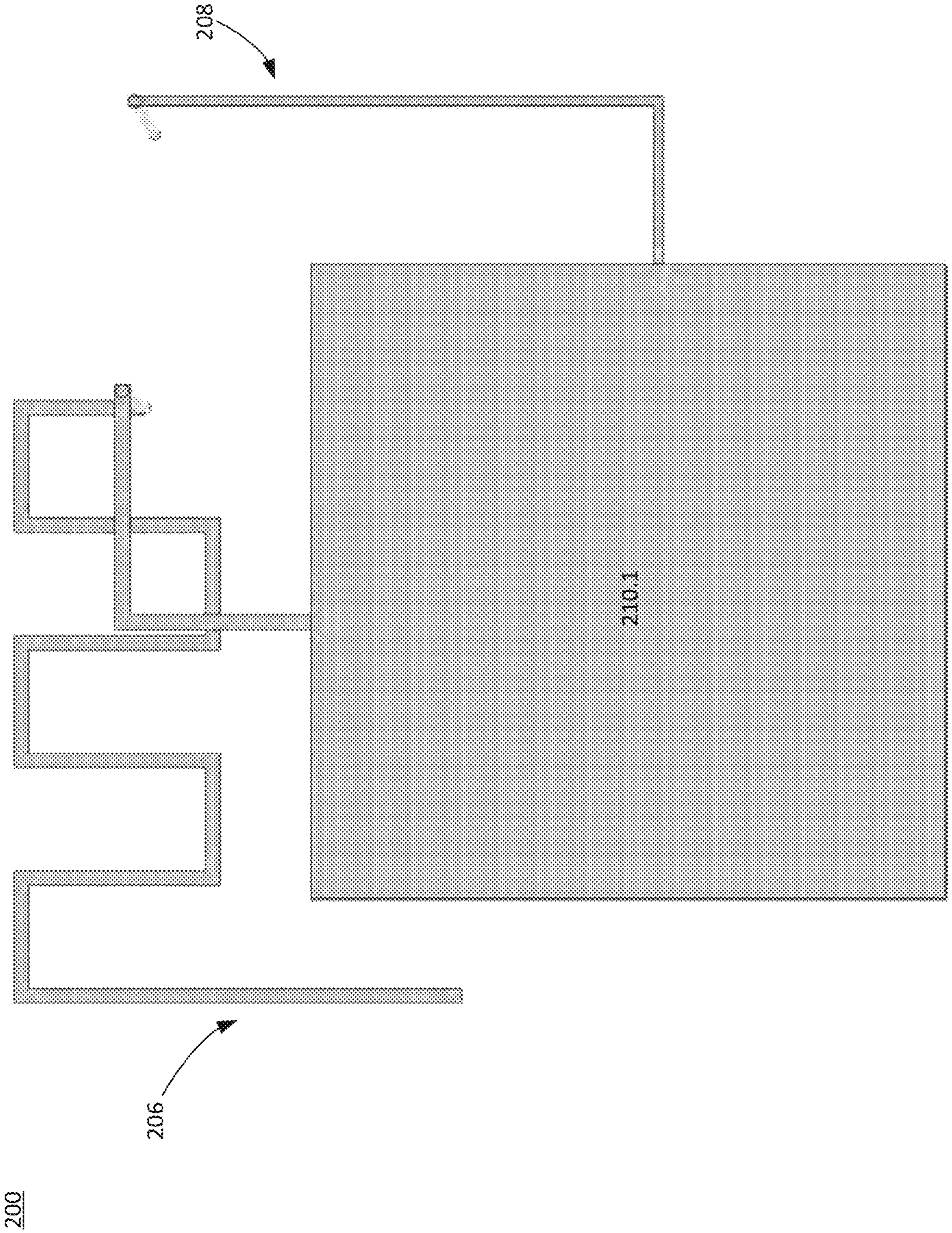
Figure 2K:
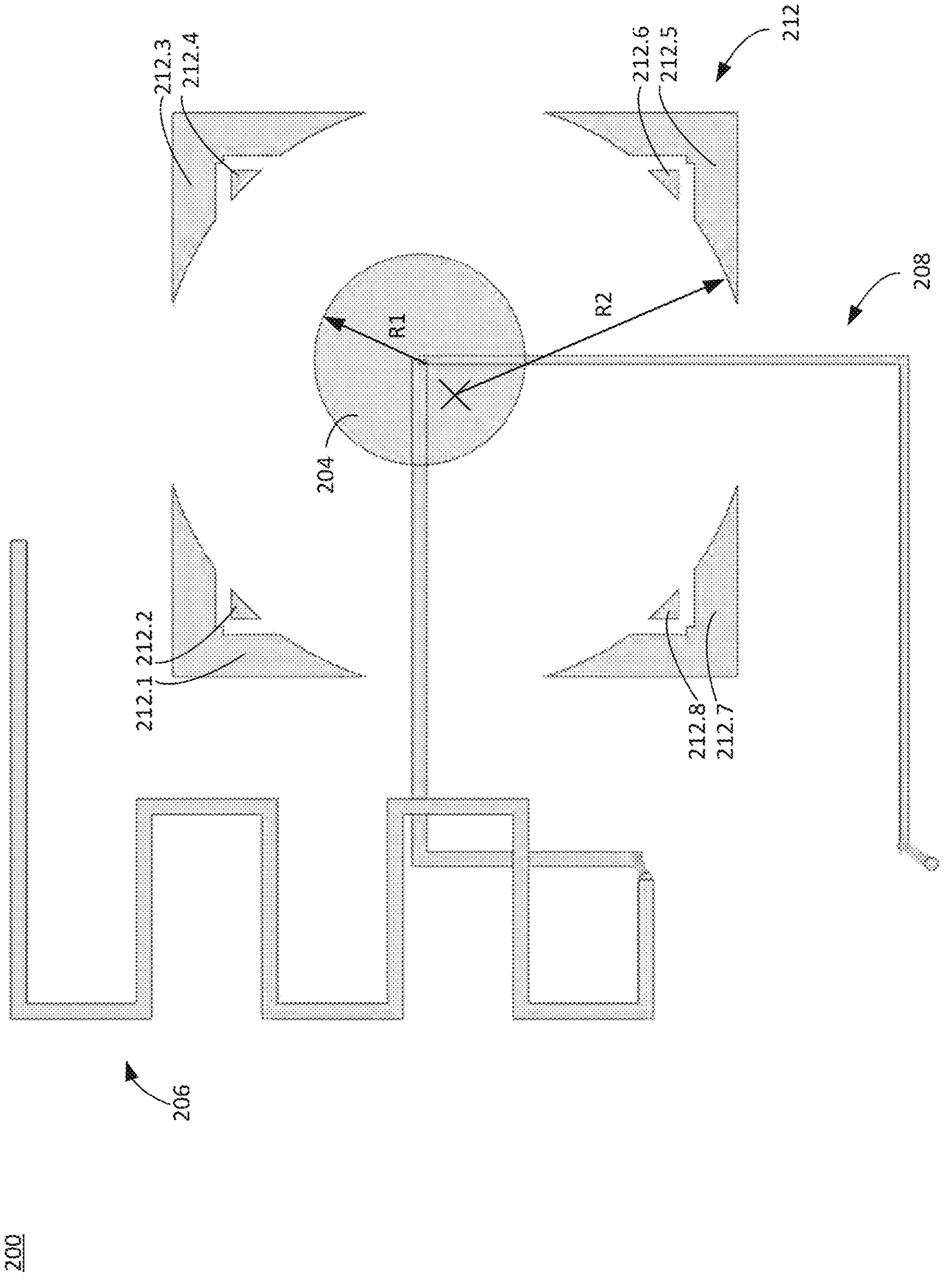

The feed layer also includes an electrically-conductive tuning plate 212, which is shown in greater detail in FIGS. 2C and 2K, and which are shown without the electrically-conductive structure including the lower plate 210.1, the upper plate 210.6, and the side plates 210.2, 210.3, 210.4, 210.5 for clarity. As shown in FIG. 2K, the disk 204 is disposed on the feed layer with the tuning plate 212. The disk 204 is disposed on the feed layer within a circular cutout region having a radius 'R2.' As shown in FIG. 2K, the tuning plate 212 comprises 8 electrically-conductive segments 212.1-212.8 arranged outside of the circle having the radius R2, which is larger than the radius R1 of the disk 204.

Although shown in the Figures as having 8 segments 212.1-212.8 arranged about a circle, the tuning plate 212 may include any suitable number N of segments 212.1-212.N, which may be arranged in any suitable pattern, have any suitable shape, and be of any suitable size based upon other adjustments to the components of the SIW cavity antenna design 200 and/or depending upon the particular frequencies and/or frequency bands of operation. In one alternative scenario, the tuning plate 212 may include segments 212.1-212.N arranged about other shapes, which may or may not match the shape and/or contour of the disk 204. The tuning plate 212 functions to provide impedance matching for the SIW cavity antenna design 200 by way of the segments 212.1-212.8, which act as perturbations to create additional impedance bandwidth. The additional impedance bandwidth is achieved as a result of the interaction between the segments 212.1-212.8 with the disk 204, which causes additional excitation modes in the SIW cavity. That is, the excitation of the disk 204 via the antenna feed 202 introduces a mode of excitation into the SIW cavity, and the additional reflections caused by these interaction between the segments 212.1-212.8 and the disk 204 within the SIW cavity results in the introduction of additional excitation modes, thus expanding the bandwidth of operation.

Again, to cover a larger impedance bandwidth, the geometric symmetry inside the SIW cavity is broken by implementing distributed inductive transmission lines. The geometric symmetry may be further broken to increase the impedance bandwidth by offsetting the centers of the electrically-conductive disk 204 and the tuning plate 212 from one another. Thus, and regardless of the implementation of the tuning plate 212, the disk 204 may have a center that is offset from the center of both the lower plate 210.1 and the tuning plate 212. That is, the lower plate 210.1 and the tuning plate 212 are assumed to be parallel with one another in this scenario and share a common center. This offset is shown in further detail in FIG. 2K, with the center of the disk 204 (i.e. the origin of the radius R1) illustrated as being offset from the center (i.e. the origin of the radius R2) of the tuning plate 212 (and thus also offset from the center of the lower plate 210.1) in two directions that are orthogonal to one another. Thus, assuming that the feed layer occupies the x-y plane in the scenario as shown in the Figures, the electrically-conductive disk 204 is offset in both the x- and the y-directions from the center of both the tuning plate 212 and the lower plate 210.1.

This offset arrangement between the center of the disk 204 and the center of the tuning plate 212 and the lower plate 210.1 is a non-limiting scenario, and the centers of the disk 204 and the tuning plate 212 may have any suitable arrangement with respect to one another. In other alternate scenarios, the center of the electrically-conductive disk 204, the center of the tuning plate 212, and the center of the lower plate 210.1 may be offset from one another in only one direction or aligned with one another. The number of offset directions and/or the amount of the offset(s) may be varied as a tuning parameter based upon other adjustments to the components of the SIW cavity antenna design 200 and/or depending upon the particular frequencies and/or frequency bands of operation.

Again, the SIW cavity antenna design 200 as discussed herein may be configured to operate in accordance with specific bands that correspond to the 2.4 GHz and 5-7 GHz frequency bands that are implemented as part of the Wi-Fi 6, Wi-Fi 6E, and Wi-Fi 7 standards, but are not limited to Wi-Fi frequencies or implementation in accordance with Wi-Fi communication standards. With this in mind, the operation of the SIW cavity antenna design 200 is further discussed in the context of the aforementioned 2.4 GHz and 5-7 GHz frequencies in a non-limiting sense. The dimensions of an implementation the SIW cavity antenna design 200 for Wi-Fi frequency band operation as discussed herein is shown in further detail in FIG. 2B, which illustrates the dimensions of the components of the SIW cavity antenna design 200 as 9.16 mm×9.16 mm×5.43 mm. In one scenario using FR4 as the substrate, the total dimensions of the SIW cavity antenna design 200 (without the meander line monopole radiator 206) are, respectively, 14.2 mm×14.4 mm×5.43 mm ($0.11\lambda_0 \times 0.12\lambda_0 \times 0.04\lambda_0$ at 2.4 GHz). Thus, the SIW cavity antenna 200 is considered an electrically small antenna based upon the Wi-Fi frequencies of operations as discussed herein.

Figure 3A:
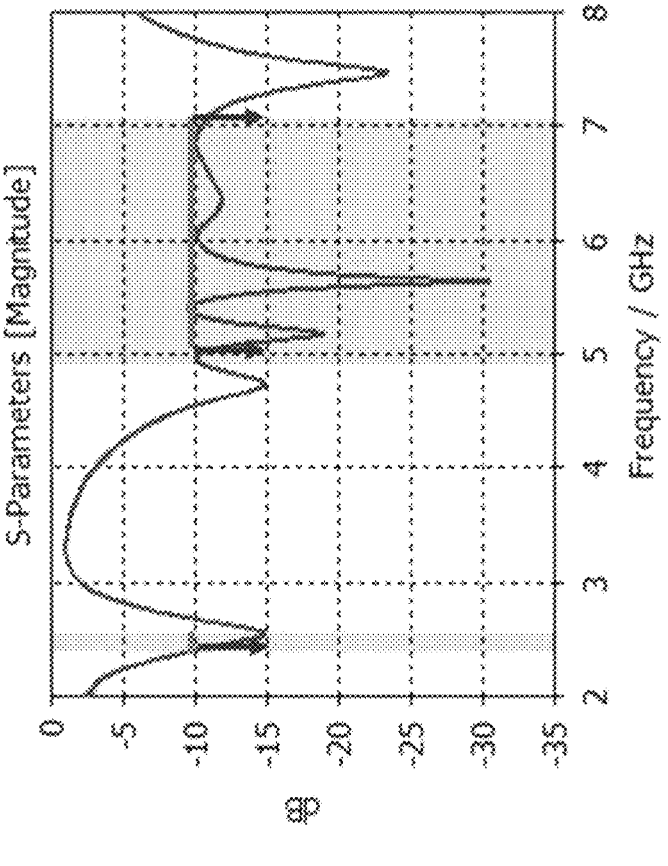
FIGS. 3A-3B illustrate graphs of the performance of the SIW cavity antenna design 200, in accordance with the disclosure.
Figure 3B:
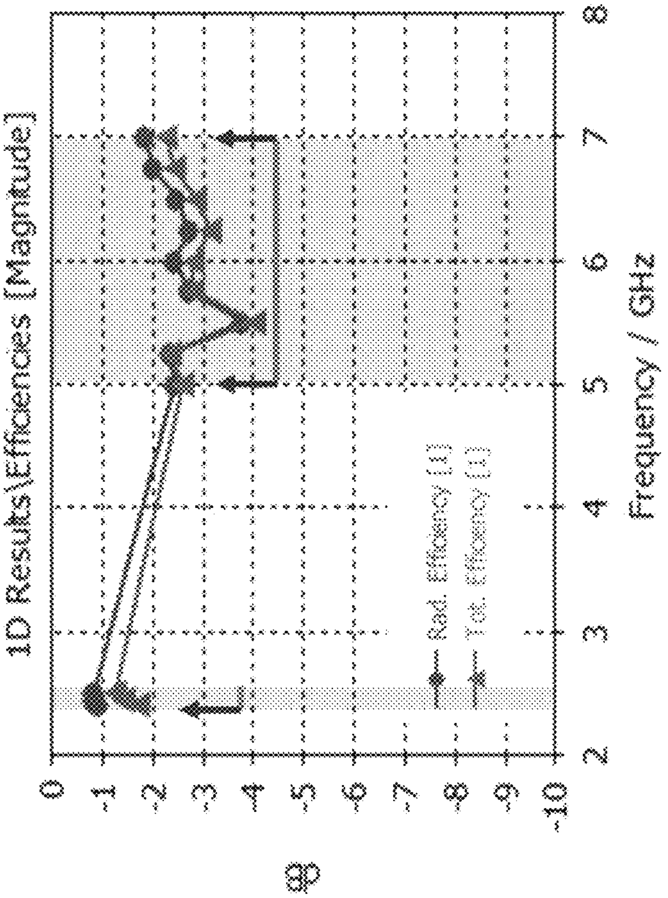

FIGS. 3A-3B illustrate graphs of the performance of the SIW cavity antenna design 200, in accordance with the disclosure. FIG. 3A shows a graph of reflection-coefficient magnitude versus frequency, whereas FIG. 3B illustrates antenna radiation efficiency versus frequency. As shown in FIG. 3A, the reflection level supports both the 2.4 GHz industrial, scientific and medical (ISM) band (such as 2.40-2.50 GHz or smaller subsets thereof) as well as the emerging 5-7 GHz band with "continuous" multiple resonances. As shown in FIG. 3B, the resulting antenna radiation efficiency over the 5-7 GHz band as well as 2.4 GHz ISM band meets the Wi-Fi radiation-efficiency specification.

The performance as shown in FIGS. 3A-3B is achieved by breaking a single resonance assumption in the fundamental-limit theory on antenna size and performance. The trade-off is that the phase response over the 5-7 GHz frequency band may be slightly dispersive (or slightly non-linear). However, given that the channel bandwidth of current Wi-Fi 6/6E and the next-generation Wi-Fi 7 does not exceed 320 MHz, the phase response of each 320-MHz channel in the 2 GHz band (i.e. 5-7 GHz) is substantially linear. In addition, although there may still exist a slight dispersion in the 320 MHz channel, this does not impact throughput performance due to the nature of orthogonal frequency-division multiplexing (OFDM)-based modulation of Wi-Fi technologies.

Broadband Antenna Performance

To provide an illustrative scenario demonstrating the performance of the SIW cavity antenna design 200, a sample antenna requirements/recommendations for laptops in accordance with Wi-Fi 6E are listed below in Table 1.

TABLE 1

| Frequency (GHz) | Reflection Coefficient, dB Recommend (Typical) | Efficiency, dB (%) | Peak gain, dBi | MIMO Metric |
|---|---|---|---|---|
| 2.4-2.49 | −10 (−6) | −3.9 dB (40.7%) | <3 dBi | Correlation coefficients |
| 5.15-5.85 | −10 (−6) | −4.4 dB (36.3%) | <5 dBi | <0.3 Gain |
| 5.925-7.125 | −10 (−6) | −4.4 dB (36.3%) | <5 dBi | Imbalance: <1 dB |

The SIW cavity antenna 200 design as discussed herein meets all these requirements, and the calculated results are described in further detail below with respect to these metrics.

Figure 4:
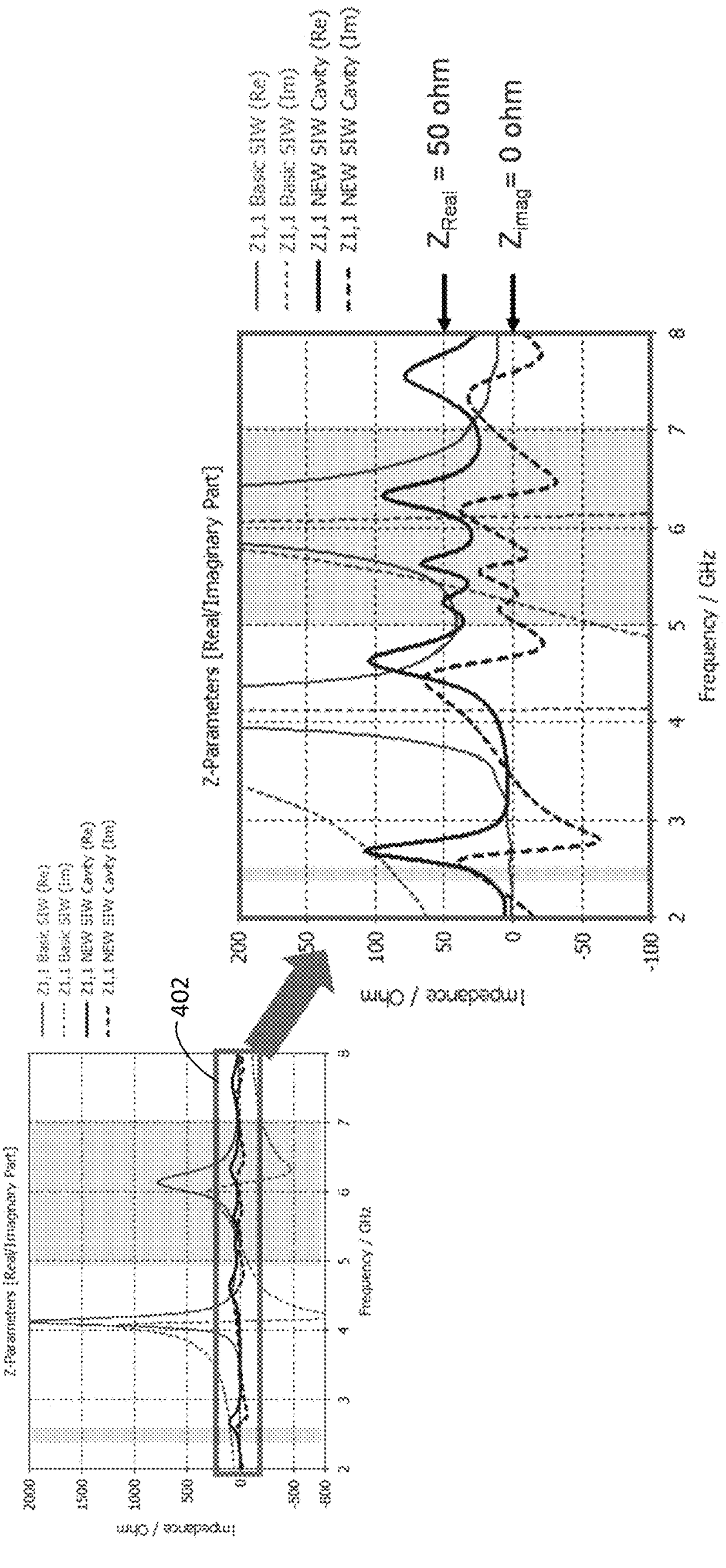
FIG. 4 illustrates a comparison in antenna impedances of a conventional SIW cavity antenna and the SIW cavity antenna design 200, in accordance with the disclosure.

FIG. 4 illustrates a comparison in antenna impedances of a conventional SIW cavity antenna and the SIW cavity antenna design 200, in accordance with the disclosure. The plots shown in FIG. 4 illustrate antenna impedance versus frequency for a conventional SIW cavity antenna, such as the conventional SIW cavity antenna as shown in FIGS. 1A-1D, which are illustrated in red, labeled "basic," and include the traces outside of the boundary 402. The plots shown in FIG. 4 also illustrate antenna impedance versus frequency for the SIW cavity antenna design 200 as shown in FIGS. 2A-2K, which are illustrated in blue, labeled "new," and include the traces contained entirely inside the boundary 402. The plot shown in FIG. 4 thus validates the significant improvement of the reflection coefficient performance of the SIW cavity antenna design 200 versus conventional designs. As shown in FIG. 4, the antenna impedance of the SIW cavity antenna design 200 is well matched to 50 Ohms across the band of interest. Variation of the impedance referenced to 50 Ohm is very small compared with the conventional SIW cavity antenna.

Figure 5A:
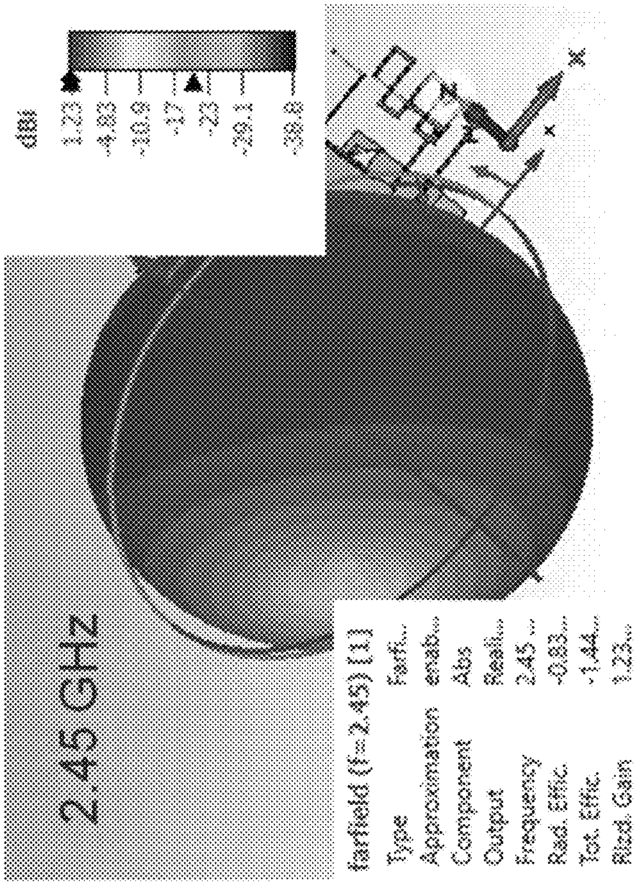
FIGS. 5A-5B illustrate radiation patterns of the SIW cavity antenna design 200 at different frequencies of operation, in accordance with the disclosure.
Figure 5B:
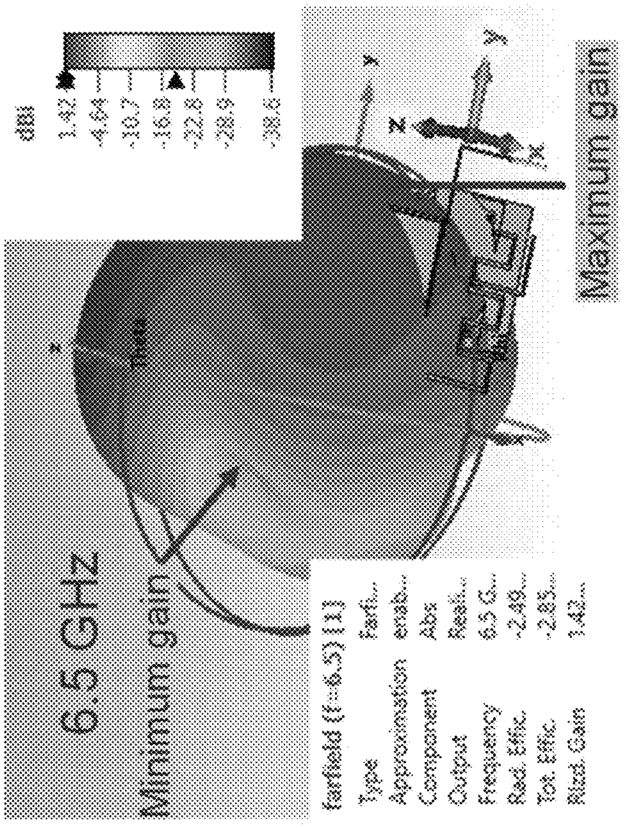

FIGS. 5A-5B illustrate radiation patterns of the SIW cavity antenna design 200 at different frequencies of operation, in accordance with the disclosure. FIG. 5A illustrates a radiation pattern plot corresponding to 2.45 GHz operation, whereas FIG. 5B illustrates a radiation pattern plot corresponding to 6.5 GHz operation. Each of the frequencies referenced with respect to FIG. 5A and FIG. 5B corresponds to the center frequency of the 2.4 GHz and 5-7 GHz frequency bands, respectively, as discussed herein. Table 2 reproduced below summarizes the peak gains of the SIW cavity antenna design 200 at the frequencies of 2.45 GHz and 6.5 GHz.

TABLE 2

| Frequency | 2.4-2.5 GHz | 5-7 GHz |
|---|---|---|
| Peak gain (requirement) | <3 dBi | <5 dBi |
| Peak gain (simulation) | 1.49 dBi | 2.33 dBi |

As shown in FIG. 5B, the pattern at 6.5 GHz demonstrates the self-shielded antenna feature with minimum gain toward the cavity (i.e. towards the closed sides of the SIW cavity antenna design 200) and a maximum gain toward free space (i.e. towards the open sides that form the antenna apertures). FIG. 5A also shows that the pattern at 2.45 GHz corresponds to that of a typical wire or monopole antenna pattern, with a maximum gain along the diagonal direction of the SIW cavity antenna design 200) ($\phi$=135° and a minimum gain towards the platform ($\phi$=225°, i.e. in the direction towards the electronic device in which the SIW cavity antenna design 200 is mounted by way of the closed sides of the SIW cavity antenna design 200 as discussed herein. It is noted that the angles referenced above follow the conventional definition of spherical coordinate systems (i.e. the "right-hand" rule). In accordance with this system, the angle Phi ($\phi$) starts at the X-axis (i.e. X-axis is $\phi$=0° and the Y-axis is $\phi$=90°). The angle $\phi$ increases in a counter-clockwise manner (the right-hand rule). The X-Y-Z coordinates of the SIW cavity antenna design 200 are also illustrated in FIGS. 5A and 5B.

Thus, the antenna patterns in an electronic device such as a laptop should mitigate RFI noise introduced into the laptop when transmitting while shielding SIW cavity antenna design 200 from RFI caused by the laptop while receiving, thereby maintaining wireless communication performance. Therefore, total signal-to-noise ratio (SNR) is thereby improved by reducing the noise level at the receiver.

Figure 6B:
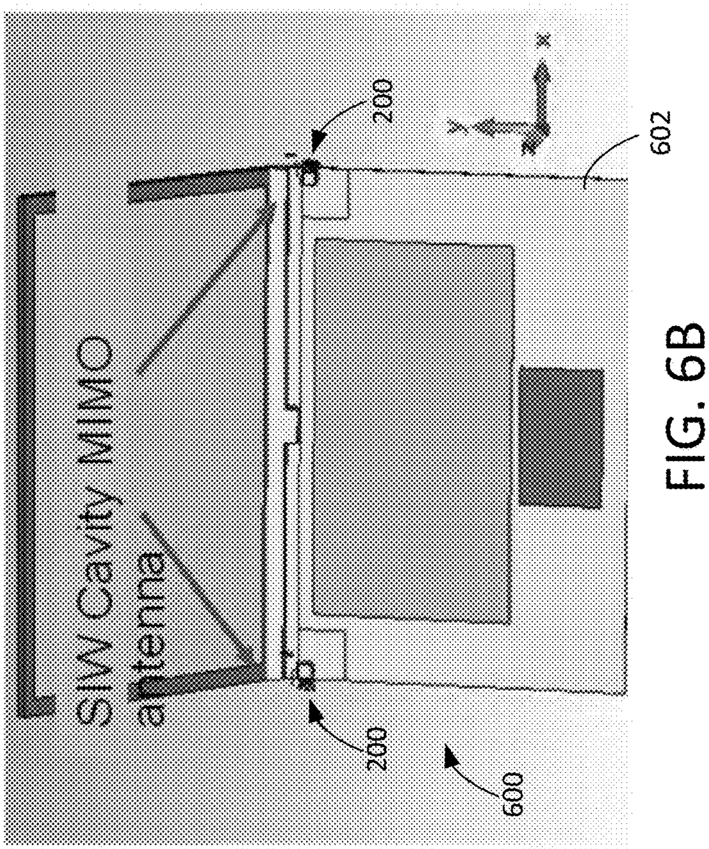
FIGS. 6A-6B illustrate a comparison between the use of conventional planar inverted F antennas (PIFAs) as part of a laptop multiple-input multiple-output (MIMO) configuration versus the use of the SIW cavity antenna design 200 in a MIMO configuration, in accordance with the disclosure.
Figure 6A:
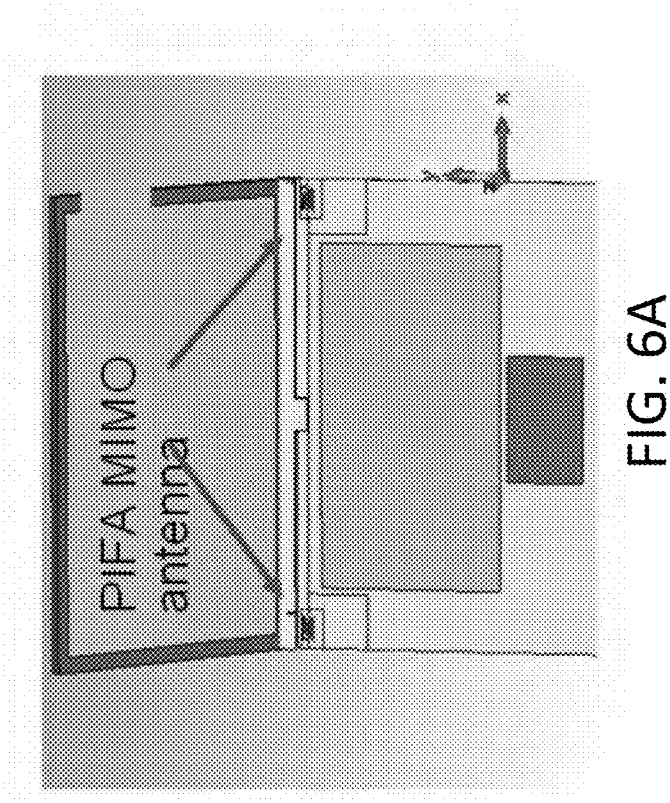
FIG. 6A prior art

FIGS. 6A-6B illustrate a comparison between the use of conventional planar inverted F antennas (PIFAs) as part of a laptop multiple-input multiple-output (MIMO) configuration versus the use of the SIW cavity antenna design 200 in a MIMO configuration, in accordance with the disclosure. The configuration as shown in FIG. 6A uses conventional PIFA antennas as a point of reference to illustrate the improvements in performance realized by way of the SIW cavity antenna design 200. The configuration as shown in FIG. 6B implements two of the SIW cavity antenna designs 200 as discussed herein, with each SIW cavity antenna design 200 being disposed in a different corner of the laptop 600, inside the housing 602.

Figure 7A:
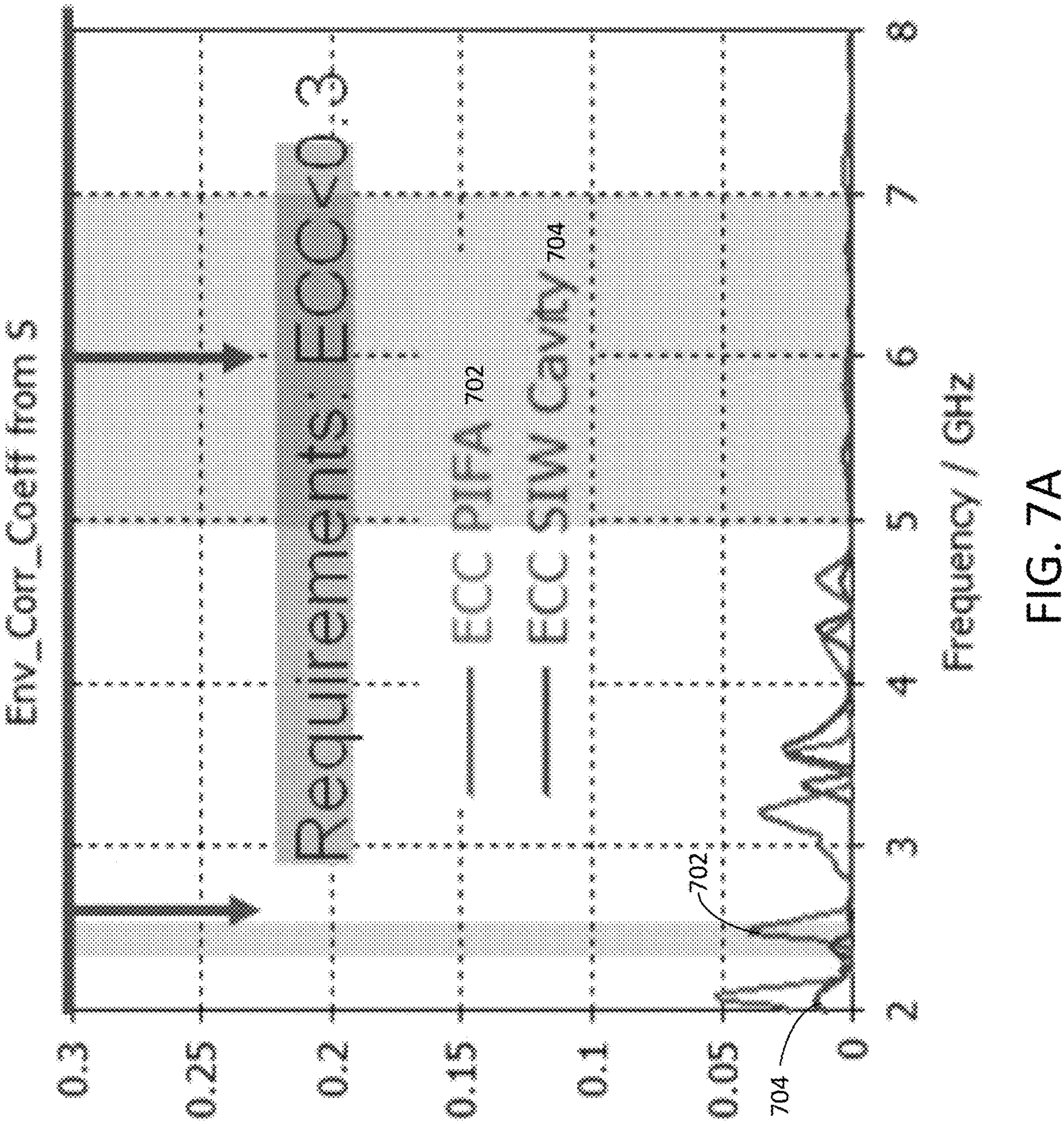
FIGS. 7A-7C illustrate a comparison between envelope correlation coefficients (ECCs) for each of the configurations as shown in FIGS. 6A-6B.
Figure 7B:
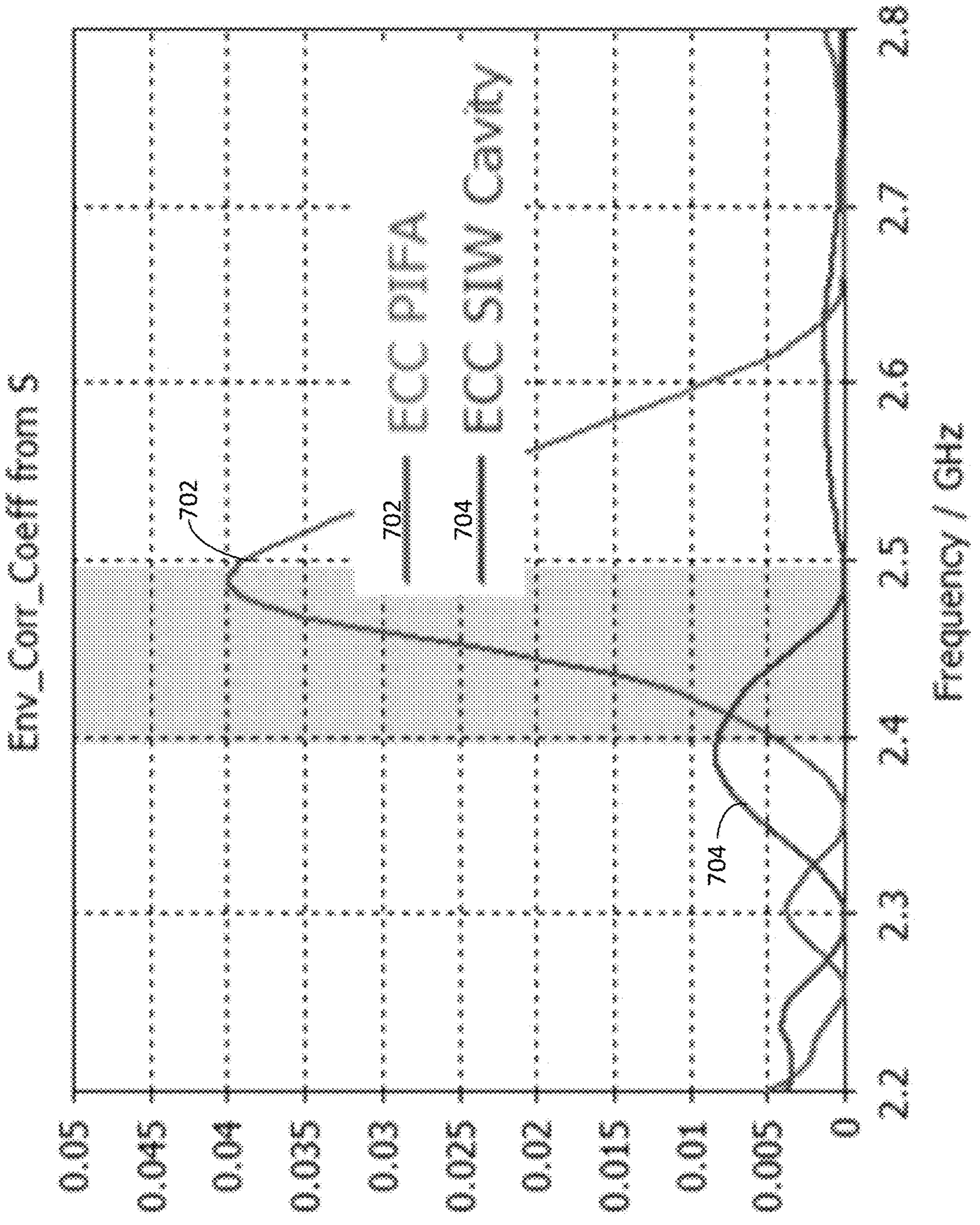
Figure 7C:
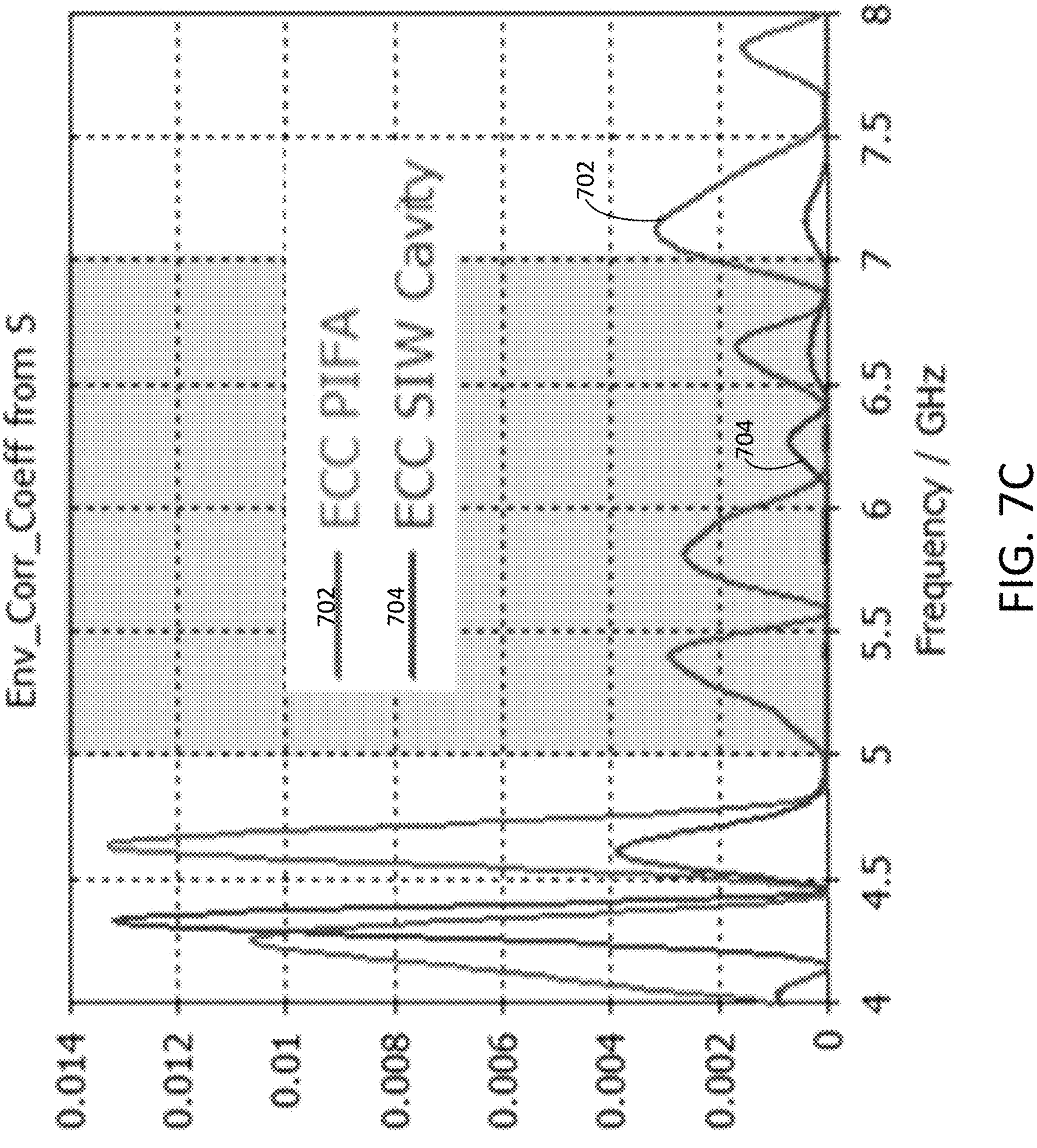

FIGS. 7A-7C illustrate a comparison between envelope correlation coefficients (ECCs) for each of the configurations as shown in FIGS. 6A-6B. The plot as shown in FIG. 7A illustrates the ECCs for both the PIFA antenna configuration and the SIW cavity antenna design 200 configuration as shown in FIG. 6A and FIG. 6B, respectively. For each of the FIGS. 7A-7C, the green trace (702) corresponds to the PIFA configuration as shown in FIG. 6A, and the red trace (704) corresponds to the SIW cavity antenna design 200 as shown in FIG. 6B. Each of the plots as shown in FIGS. 7A-7C illustrates a different frequency band, with FIG. 7A illustrating a wide band between 2-8 GHz, FIG. 7B illustrating the 2.4 GHz frequency band operation between 2.2-2.8 GHz, and FIG. 7C illustrating the 5-7 GHz frequency band operation between 4-8 GHz.

FIGS. 8A-8B illustrate a comparison between the use of conventional planar inverted F antennas (PIFAs) in free space with a shared ground plane in close proximity as part of a multiple-input multiple-output (MIMO) configuration versus the use of the SIW cavity antenna design 200 in free space with a shared ground plane in close proximity as part of a MIMO configuration, in accordance with the disclosure.

FIG. 9 illustrates a comparison between envelope correlation coefficients (ECCs) for each of the configurations as shown in FIGS. 8A-8B. FIG. 9 illustrates a wide band of operation between 2-8 GHz. The plot as shown in FIG. 9 illustrates the ECCs for both the PIFA antenna configuration and the SIW cavity antenna design 200 configuration as shown in FIG. 8A and FIG. 8B, respectively. The green trace (902) corresponds to the PIFA configuration as shown in FIG. 8A, and the red trace (904) corresponds to the SIW cavity antenna design 200 as shown in FIG. 8B.

With reference to FIGS. 7A-7C and FIG. 9, the ECCs are calculated with two identical SIW cavity antennas with symmetric antenna placement in a laptop (for FIGS. 7A-7C) and in free space proximate to a shared ground plane (for FIG. 9). The results demonstrate that the MIMO antenna model as shown in FIG. 6B meets the ECC requirement with plenty of margin for both simulation models (i.e. the models as shown in FIGS. 6B and 8B). In the simulations, ECCs of the conventional MIMO PIFAs are compared as a reference to demonstrate how the SIW cavity antenna design 200 in MIMO configurations outperforms conventional PIFA antenna designs commonly used in accordance with such applications.

RFI Noise Mitigation Performance

FIG. 10 illustrates a noise model configuration comparing the use of a conventional PIFA in a laptop versus the use of the SIW cavity antenna design 200, in accordance with the disclosure. Thus, FIG. 10 illustrates on the left side the use of a conventional PIFA in a laptop, whereas the right side illustrates the use of the SIW cavity antenna design 200 in the laptop. Both the conventional PIFA and the SIW cavity antenna design 200 are exposed to the same noise model.

FIGS. 11A-11B illustrate a comparison in radiation patterns for the use of a conventional PIFA in a laptop versus the use of the SIW cavity antenna design 200, in accordance with the disclosure. The radiation pattern shown in FIG. 11A corresponds to a center frequency of 6.5 GHz for the conventional PIFA implementation operating in the presence of the noise model as shown in FIG. 10. The radiation pattern shown in FIG. 11B corresponds to a center frequency of 6.5 GHz for the use of the SIW cavity antenna design 200 operating in the presence of the noise model as shown in FIG. 10. From the plot information as shown, it is observed that the SIW cavity antenna design 200 (FIG. 11B) has improved performance with respect to both radiated and total efficiency compared to the conventional PIFA (FIG. 11A).

FIGS. 12A-12B illustrate graphs comparing the performance of a conventional PIFA in a laptop versus the use of the SIW cavity antenna design 200, in accordance with the disclosure. FIG. 12A represents a plot of S-parameters between a frequency band of 2-8 GHz for both the conventional PIFA implementation operating in the presence of the noise model as shown in FIG. 10 (traces 1204, 1208), as well as the SIW cavity antenna design 200 operating in the presence of the noise model as shown in FIG. 10 (traces 1202, 1206). The port nomenclature used in this scenario is provided with reference to FIG. 10, and is as follows:

Port 1: SIW antenna design 200 port

Port 2: Conventional PIFA port

Port 3: Noise source (noise model)

Therefore, |S11| represents the reflection coefficient of the SIW antenna design 200, |S22| represents the reflection coefficient of the conventional PIFA, |S13| represents the platform noise level onto the SIW antenna design 200, and |S23| represents the platform noise level onto a conventional PIFA.

FIG. 12B shows additional detail with respect to the S-parameter plot as shown in FIG. 12, which corresponds to the box 1210. Thus, the SIW cavity antenna design 200 and the conventional PIFA are exposed to the same noise environment within a laptop platform. The simulation results as shown in FIGS. 12A-12B show a platform noise immunity improvement of ~4 dB (average) and ~7.3 dB (average) at the frequencies of 2.4 GHz and 5~7 GHz, respectively (traces 1206, 1208).

It is noted that the SIW cavity antenna design 200 provides protection against RFI that may be present in an environment to mitigate noise that may otherwise be coupled into the SIW cavity antenna, resulting in reduced wireless performance. The SIW cavity antenna design 200, and in particular the four closed sides of the cavity antenna structure, also function to shield such components from electromagnetic signal transmissions originating from the SIW cavity antenna. Thus, the closed sides of the SIW cavity antenna design 200 function to isolate or shield the SIW cavity antenna from the components of the particular platform in which the SIW cavity antenna design 200 may be implemented Advantageously, the closed sides of the SIW cavity antenna design 200 may additionally function as a heat sink or heat shield to obviate (or at least reduce) the need for conventional heat sinking structures. Thus, the closed sides of the SIW cavity antenna design 200 may function to shield the components of the SIW cavity antenna design 200 and other components coupled thereto (such as transceivers, impedance matching devices, etc.) from heat generated by nearby components of the particular platform in which the SIW cavity antenna design 200 may be implemented (such as those in a laptop, a mobile device, etc.).

Plug-and-Play Antenna Performance

FIG. 13 illustrates placement of the SIW cavity antenna design on a ground plane that is varied in size to show robustness to ground plane size variations, in accordance with the disclosure. As shown in FIG. 13, the SIW cavity antenna design 200 as discussed herein is disposed on a ground plane that occupies the x-y plane, such that the lower plate 210.1 is electrically coupled to the ground plane 1300. As further discussed below, the dimensions of the ground plane 1300 are adjusted via simulation, and the resulting performance of the SIW cavity antenna design 200 is then measured.

FIGS. 14A-14B illustrate simulated antenna performance metrics for variations of ground plane size as shown in FIG. 13, in accordance with the disclosure. FIG. 14A shows a simulated reflection coefficient plot corresponding to the performance of the SIW cavity antenna design 200 between 2-8 GHz for ground plane sizes as shown in FIG. 13 of 25 mm×25 mm (trace 1402), 10 mm×10 mm (trace 1406), 15 mm×15 mm (trace 1406), and 20 mm×20 mm (trace 1408). FIG. 14B shows a simulated radiation efficiency plot corresponding to the performance of the SIW cavity antenna design 200 between 2-8 GHz for ground plane sizes as shown in FIG. 13 of 25 mm×25 mm (circle legend), 10 mm×10 mm (triangle legend), 15 mm×15 mm (square legend), and 20 mm×20 mm (inverted triangle legend). The portions 1410, 1412 in each of the FIGS. 14A-14B highlight operation of the SIW cavity antenna design 200 in the 2.4 GHz and the 5-7 GHz frequency bands, respectively.

Due to the structure of the SIW cavity antenna design 200, an advantageous benefit of the design is the "plug-and-play" implementation. In other words, the performance of the SIW cavity antenna design 200 is not largely affected by the size of the ground plane onto which the SIW cavity antenna design 200 is mounted. This is observed in the plots shown in FIGS. 14A-14B, which indicate minimum variations in the 5-7 GHz band of operation, as illustrated in the portion 1412 for both the reflection coefficient and the radiation efficiency plots. In the event that the meander line monopole radiator 206 is present, as is the case in the present simulation, any variations in the 2.4 GHz band, as denoted in portion 1410 of the plots shown in FIGS. 14A-14B, may be compensated using any suitable type of impedance matching device. One such impedance matching device is shown in FIG. 15A, and includes a connected network of passive components, which may have values that are electronically or otherwise adjustable.

The "port 1" as shown in FIG. 15A indicates an input port of a matching network that is comprised of lumped elements (L1, C1, and C2 in this scenario), which is inter-connected to the port of the SIW antenna design 200 to facilitate impedance matching and tuning of the 2.4 GHz band of operation. The number of lumped elements and the configuration as shown in FIG. 15A is a non-limiting illustration provided for ease of explanation, and the impedance matching network used for the SIW antenna design 200 may implement any suitable number, type, and/or configuration of lumped elements. In any event, and using the operating frequencies as noted herein as an illustrative and non-limiting scenario, the matching network is configured to tune the antenna impedance at the frequency of 2.4~2.5 GHz with minimum impact to the antenna performance at the frequency of 5~7 GHz. In other words, the impedance matching network functions to tune the impedance of the SIW antenna design 200 in one frequency band (such as the aforementioned 2.4-2.5 GHz band) independently of the other frequency bands of operations.

It is noted that because the variations are minimal for the 5-7 GHz band as shown in FIGS. 14A-14B, only a single opening is required in the SIW cavity antenna design on top of the meander line monopole radiator 206 to accommodate an impedance matching device. The simulated result of using an impedance matching device as shown in FIG. 15A is illustrated in FIG. 15B, which indicates an improvement to the reflection coefficient in the 2.4 GHz frequency band without altering the reflection coefficient in the 5-7 GHz frequency band. Although the impedance matching device as shown in FIG. 15A is directed to compensating for the proximity of a metallic object as shown in FIG. 13, the impedance matching device may be utilized to adjust the impedance of the meander line monopole radiator 206 in response to the variation of any suitable number and/or type of antenna tuning parameters or other conditions identified with the electronic device in which the SIW cavity antenna

200 is implemented, such as the other conditions further discussed below with reference to FIGS. 16-21B.

FIG. 16 illustrates the placement of the SIW cavity antenna design 200 in proximity to a metal structure to show robustness of antenna performance in such environments, in accordance with the disclosure. In the scenario as shown in FIG. 16, the two vertical (i.e. monopole) closed sides of the SIW cavity antenna design 200 are placed 3 mm from a simulated metallic component that is assumed to be present in a platform in which the SIW cavity antenna design 200 is mounted. This simulation is then repeated by varying the gap between 3 mm and 10 mm in 1 mm increments. The robustness of the SIW cavity antenna design 200 to the proximity to metallic objects is observed in the plots shown in FIGS. 17A-17B, which indicate minimum variations in the reflection coefficient (FIG. 17A) and the total radiation efficiency (FIG. 17B) over the entire 2-8 GHz band of operation as the gap as shown in FIG. 16 is varied between 3 mm and 10 mm.

FIG. 18 illustrates the coupling of a portion of the SIW cavity antenna design 200 to a metal structure to show robustness of antenna performance in such environments, in accordance with the disclosure. In the scenario as shown in FIG. 18, the upper plate 210.6 of the SIW cavity antenna design 200 is coupled to a metallic structure that is assumed to be present in a platform in which the SIW cavity antenna design 200 is mounted. This simulation is then repeated by varying the gap between 3 mm and 10 mm in 1 mm increments, as was the case for the simulation as discussed above with respect to FIG. 16, but maintaining the electrical contact between the SIW cavity antenna design 200 and the metallic structure in each case. The robustness of the SIW cavity antenna design 200 to both the proximity to metallic objects and coupling to metallic objects is observed in the plots shown in FIGS. 19A-19B, which indicate minimum variations in the reflection coefficient (FIG. 19A) and the total radiation efficiency (FIG. 19B) over the entire 2-8 GHz band of operation as the gap as shown in FIG. 18 is varied between 3 mm and 10 mm.

Thus, FIGS. 13-19B demonstrate that the SIW cavity antenna design 200 has a very robust performance in various environments, and an electronic device platform may advantageously implement a minimal keep out distance when utilizing the SIW cavity antenna design 200.

Feasibility of Thickness Reduction

As discussed herein with reference to FIG. 2B, the SIW cavity antenna design 200 may have a height or overall thickness of 5.43 mm in one illustrative scenario, which may include operation in accordance with the Wi-Fi 6/6E/7 standards. However, it may be desirable for other applications to further reduce the height of the SIW cavity antenna 200, such as for current and future laptop designs that may utilize ever-shrinking thickness specifications.

Thus, FIG. 20 illustrates a simulated SIW cavity antenna design having a reduced profile, in accordance with the disclosure. The overall height or profile of the SIW cavity antenna 200 as shown in FIG. 20 has been reduced from 5.43 mm as shown in FIG. 2B to 4.6 mm through an optimization process. This reduction in height may be achieved by reducing the thickness between the ground layer and the feed layer, as well as reducing the thickness between the feed layer and the capacitive layer as discussed herein. These reductions in layer thicknesses may be equal or unequal to achieve the desired performance properties of the SIW cavity antenna 200. This results in a sacrificed performance but still presents a solution for which a tradeoff may be acceptable. However, it is understood that additional dimensions of the SIW antenna design 200 may be adjusted as part of further optimization processes to further increase the antenna performance when reducing the height. Thus, the simulation as shown in FIG. 20 demonstrates a possibility of further thickness reduction through additional optimization processes.

In any event, the reduction in the thickness of the SIW cavity antenna 200 negatively impacts the reflection coefficient performance, but this may be considered an acceptable tradeoff in some implementations in which the reduced profile is more desirable. The impact of the reduction in the height of the SIW cavity antenna 200 on antenna performance is observed in the plots shown in FIGS. 21A-21B, which illustrate changes in simulated antenna performance metrics caused by varying the height of the SIW cavity antenna as shown in FIG. 20, in accordance with the disclosure. FIG. 21A shows a simulated reflection coefficient plot corresponding to the performance of the SIW cavity antenna design 200 between 2-8 GHz for heights corresponding to 5.4 mm as shown in FIG. 2B (trace 2102), a height of 5 mm (trace 2104), and a height of 4.6 mm as shown in FIG. 20 (trace 2106).

As shown in FIG. 21A, the SIW cavity antenna 200 provides an acceptable reflection coefficient of −6 dB over the band of interest for WiFi 6E/7 (i.e. the 5-7 GHz frequency band) without sacrificing antenna efficiency, as shown in FIG. 21B, which allows the SIW cavity antenna 200 to still meet the antenna efficiency requirements for the reduced height of 4.6 mm. The height of the SIW cavity antenna 200 is not limited to those shown and discussed, and further reductions in height are conceived utilizing further optimization processes, which may provide performance that is acceptable for laptop applications including desktop PC and workstations, etc.

FIG. 22 illustrates an electronic device, in accordance with the present disclosure. The electronic device 2200 may be identified with any suitable type of device that implements the SIW cavity antenna design 200 as discussed herein to perform wireless communications. The electronic device 2200 may be identified with a wireless device, a user equipment (UE), or other suitable device configured to perform wireless communications such as a mobile phone, a desktop computer, a laptop computer, a cellular base station, a tablet, a wearable device, etc., which may include one or more components configured to transmit and receive radio signals using one or more of the SIW cavity antenna design(s) 200 as discussed herein. The electronic device 2200 may implement a housing 2201 that is comprised of any suitable type of material such as metal, plastic, combinations of these, etc., with one or more of the SIW cavity antenna design(s) 200 as discussed herein being disposed within the housing. In one scenario, the electronic device 2200 may be identified with the laptop 600 as discussed with respect to FIG. 6B, and thus the housing 2201 may likewise be identified with the housing 602.

As further discussed herein, the electronic device 2200 may implement any suitable number of SIW cavity antennas 200, which may be coupled to the transceiver 2204 via the antenna feed 202 to enable the electronic device 2200 to transmit and/or receive signals. Although a single SIW cavity antenna design 200 is shown in FIG. 22, the electronic device 2200 may implement any suitable number of SIW cavity antenna design(s) 200 to perform wireless communications. To do so, the electronic device 2200 may include processing circuitry 2202, a transceiver 2204, and a memory 2206. The components shown in FIG. 22 are provided for ease of explanation, and the electronic device 2200 may implement additional, less, or alternative components as those shown in FIG. 22.

The processing circuitry 2202 may be configured as any suitable number and/or type of computer processors, which may function to control the electronic device 2200 and/or other components of the electronic device 2200. The processing circuitry 2202 may be identified with one or more processors (or suitable portions thereof) implemented by the electronic device 2200. The processing circuitry 2202 may be identified with one or more processors such as a host processor, a digital signal processor, one or more microprocessors, graphics processors, baseband processors, microcontrollers, an application-specific integrated circuit (ASIC), part (or the entirety of) a field-programmable gate array (FPGA), etc.

In any event, the processing circuitry 2202 may be configured to carry out instructions to perform arithmetical, logical, and/or input/output (I/O) operations, and/or to control the operation of one or more components of electronic device 2200 to perform various functions as described herein. The processing circuitry 2202 may include one or more microprocessor cores, memory registers, buffers, clocks, etc., and may generate electronic control signals associated with the components of the device 2200 to control and/or modify the operation of these components. The processing circuitry 2202 may communicate with and/or control functions associated with the transceiver 2204 and/or the memory 2206.

The transceiver 2204 may be implemented as any suitable number and/or type of components configured to transmit and/or receive data and/or wireless signals in accordance with any suitable number and/or type of communication protocols. The transceiver 2204 may include any suitable type of components to facilitate this functionality, including components associated with known transceiver, transmitter, and/or receiver operation, configurations, and implementations. Although depicted in FIG. 22 as a transceiver, the transceiver 2204 may include any suitable number of transmitters, receivers, or combinations of these that may be integrated into a single transceiver or as multiple transceivers or transceiver modules. The transceiver 2204 may include components typically identified with an RF front end and include antennas, ports, power amplifiers (PAs), RF filters, mixers, local oscillators (LOs), low noise amplifiers (LNAs), upconverters, downconverters, channel tuners, etc. Thus, the transceiver 2204 may be configured as any suitable number and/or type of components configured to facilitate receiving and/or transmitting data and/or signals in accordance with one or more communication protocols. The transceiver 2204 may be implemented as any suitable number and/or type of components to support wireless communications such as analog-to-digital converters (ADCs), digital to analog converters, intermediate frequency (IF) amplifiers and/or filters, modulators, demodulators, baseband processors, etc.

The memory 2206 stores data and/or instructions such that, when executed by the processing circuitry 2202, cause the electronic device 2200 to perform various functions such as controlling, monitoring, and/or regulating the operation of the SIW cavity antenna design(s) 200, providing data to be transmitted to the SIW cavity antenna design(s) 200, and/or processing signals received via the SIW cavity antenna design(s) 200 as discussed herein. The memory 2206 may be implemented as any suitable type of volatile and/or non-volatile memory, including read-only memory (ROM), random access memory (RAM), flash memory, a magnetic storage media, an optical disc, erasable programmable read only memory (EPROM), programmable read only memory (PROM), etc. The memory 2206 may be non-removable, removable, or a combination of both. The memory 2206 may be implemented as a non-transitory computer readable medium storing one or more executable instructions such as, for example, logic, algorithms, code, etc.

As further discussed below, the instructions, logic, code, etc., stored in the memory 2206 are represented by the various modules as shown, which may enable the functionality disclosed herein to be functionally realized. Alternatively, the modules as shown in FIG. 22 that are associated with the memory 2206 may include instructions and/or code to facilitate the electronic device 2200 controlling and/or monitoring the operation of hardware components implemented via the electronic device 2200. In other words, the modules shown in FIG. 22 are provided for ease of explanation regarding the functional association between hardware and software components. Thus, the processing circuitry 2202 may execute the instructions stored in these respective modules in conjunction with one or more hardware components to perform the various functions as discussed herein.

The executable instructions stored in the MIMO operation module 2207 may facilitate, in conjunction with execution via the processing circuitry 2202, the electronic device 2200 transmitting and/or receiving signals via the SIW cavity antenna design(s) 200. The MIMO operation module 2207 is optional, and may be omitted when MIMO operation is not utilized or when the electronic device 2200 implements a single SIW cavity antenna design 200. The executable instructions stored in the MIMO operation module 2207 may facilitate, in conjunction with execution via the processing circuitry 2202, the electronic device 2200 implementing any suitable type of MIMO control operations to perform beam steering, antenna diversity, etc., with respect to the implemented SIW cavity antenna design(s) 200.

The executable instructions stored in the impedance matching module 2209 may facilitate, in conjunction with execution via the processing circuitry 2202, the execution of any suitable number and/or type of electronically-tunable components that may monitor the performance of (such as the return loss, radiation efficiency, etc.) and/or tune the SIW cavity antenna design(s) 200 as discussed herein. The impedance matching module 2209 may facilitate the control of one or more tunable components as discussed herein with respect to impedance matching device as shown in FIG. 15A. Therefore, the impedance matching module 2209 may function to tune the meander line monopole radiator 206 to accommodate the SIW cavity antenna design(s) 200 being implemented in electronic devices having a particular proximity to metallic objects, a particular sized ground plane, etc., as discussed herein with reference to FIGS. 13-19B.

General Configuration of a SIW Cavity Antenna

A cavity antenna is provided. With reference to FIGS. 2A-2K, the cavity antenna includes a conductive disk coupled to an antenna feed; a conductive structure including (i) a conductive upper plate, (ii) a conductive lower plate that is parallel with the conductive upper plate, and (iii) a plurality of conductive side plates, wherein the conductive structure forms four closed sides of the cavity antenna, and wherein the cavity antenna is configured to transmit or receive electromagnetic energy in accordance with a first frequency band via two open sides of the cavity antenna. The conductive disk is electrically insulated from the conductive structure. In addition or in alternative to and in any combination with the optional features previously explained in this paragraph, the conductive disk has a center that is offset from a center of the conductive lower plate. In addition or in alternative to and in any combination with the optional features previously explained in this paragraph, the center of the conductive disk is offset from the center of the conductive lower plate in two directions that are orthogonal to one another. In addition or in alternative to and in any combination with the optional features previously explained in this paragraph, the cavity antenna further includes a meander line monopole radiator coupled to the conductive disk and configured to enable the cavity antenna to further transmit or receive electromagnetic energy in accordance with a second frequency band. In addition or in alternative to and in any combination with the optional features previously explained in this paragraph, the first frequency band comprises a frequency band of 5.15-7.125 GHz, and the second frequency band comprises a frequency band of 2.40-2.49 GHz. In addition or in alternative to and in any combination with the optional features previously explained in this paragraph, the cavity antenna further includes an impedance tuning stub coupled to the conductive disk. In addition or in alternative to and in any combination with the optional features previously explained in this paragraph the meander line monopole radiator is coupled to the conductive disk at a first location, and the cavity antenna further includes an impedance tuning stub coupled to the conductive disk at a second location that is offset 90 degrees from the first location. In addition or in alternative to and in any combination with the optional features previously explained in this paragraph, the plurality of conductive side plates identified with the four closed sides of the cavity antenna include (i) a first set of conductive side plates identified with a first side from among the four closed sides of the cavity antenna, and (ii) a second set of conductive side plates identified with a second side from among the four closed sides of the cavity antenna, and the first side of the cavity antenna and the second side of the cavity antenna are orthogonal to one another and to each of the conductive lower plate and the conductive upper plate. In addition or in alternative to and in any combination with the optional features previously explained in this paragraph, the cavity antenna further includes a conductive tuning plate disposed in a same plane as the conductive disk, the conductive tuning plate comprising a plurality of conductive segments arranged outside a circle having a larger radius than that of the conductive disk.

General Configuration of an Electronic Device

An electronic device is provided. With reference to FIG. 22, the electronic device includes a housing; and a substrate integrated waveguide (SIW) cavity antenna disposed within the housing, the SIW cavity antenna including: a conductive disk coupled to an antenna feed; a conductive structure including (i) an upper plate, (ii) a lower plate that is parallel with the conductive upper plate, and (iii) a plurality of conductive side plates; wherein the conductive structure is identified with four closed sides of the cavity antenna, and wherein the cavity antenna is configured to transmit or receive electromagnetic energy in accordance with a first frequency band via two open sides of the cavity antenna. The conductive disk antenna is electrically insulated from the conductive structure. In addition or in alternative to and in any combination with the optional features previously explained in this paragraph, the conductive disk has a center that is offset from a center of the conductive lower plate. In addition or in alternative to and in any combination with the optional features previously explained in this paragraph, the center of the conductive disk identified with the SIW cavity antenna is offset from the center of the conductive lower plate in two directions that are orthogonal to one another. In addition or in alternative to and in any combination with the optional features previously explained in this paragraph the SIW cavity antenna further includes a meander line monopole radiator coupled to the conductive disk and configured to enable the cavity antenna to further transmit or receive electromagnetic energy in accordance with a second frequency band. In addition or in alternative to and in any combination with the optional features previously explained in this paragraph, the first frequency band comprises a frequency band of 5.15-7.125 GHz, and the second frequency band comprises a frequency band of 2.40-2.49 GHz. In addition or in alternative to and in any combination with the optional features previously explained in this paragraph, the SIW cavity antenna further includes an impedance tuning stub coupled to the conductive disk. In addition or in alternative to and in any combination with the optional features previously explained in this paragraph, the meander line monopole radiator is coupled to the conductive disk at a first location, and the SIW cavity antenna further includes an impedance tuning stub coupled to the conductive disk at a second location that is offset 90 degrees from the first location. In addition or in alternative to and in any combination with the optional features previously explained in this paragraph, the plurality of conductive side plates identified with the four closed sides of the cavity antenna include (i) a first set of conductive side plates identified with a first side from among the four closed sides of the cavity antenna, and (ii) a second set of conductive side plates identified with a second side from among the four closed sides of the cavity antenna, and the first side of the cavity antenna and the second side of the cavity antenna are orthogonal to one another and to each of the conductive lower plate and the conductive upper plate. In addition or in alternative to and in any combination with the optional features previously explained in this paragraph, the SIW cavity antenna further includes a conductive tuning plate disposed in a same plane as the conductive disk, the conductive tuning plate comprising a plurality of conductive segments arranged outside a circle having a larger radius than that of the conductive disk.

EXAMPLES

The following examples pertain to various techniques of the present disclosure.

An example (e.g. example 1) relates to a cavity antenna. The cavity antenna includes a conductive disk coupled to an antenna feed; a conductive structure including (i) a conductive upper plate, (ii) a conductive lower plate that is parallel with the conductive upper plate, and (iii) a plurality of conductive side plates; wherein the conductive structure forms four closed sides of the cavity antenna, and wherein the cavity antenna is configured to transmit or receive electromagnetic energy in accordance with a first frequency band via two open sides of the cavity antenna.

Another example (e.g. example 2) relates to a previously-described example (e.g. example 1), wherein the conductive disk is electrically insulated from the conductive structure.

Another example (e.g. example 3) relates to a previously-described example (e.g. one or more of examples 1-2), wherein the conductive disk has a center that is offset from a center of the conductive lower plate.

Another example (e.g. example 4) relates to a previously-described example (e.g. one or more of examples 1-3), wherein the center of the conductive disk is offset from the center of the conductive lower plate in two directions that are orthogonal to one another.

Another example (e.g. example 5) relates to a previously-described example (e.g. one or more of examples 1-4), further comprising: a meander line monopole radiator coupled to the conductive disk and configured to enable the cavity antenna to further transmit or receive electromagnetic energy in accordance with a second frequency band.

Another example (e.g. example 6) relates to a previously-described example (e.g. one or more of examples 1-5), wherein the first frequency band comprises a frequency band of 5.15-7.125 GHz, and wherein the second frequency band comprises a frequency band of 2.40-2.49 GHz.

Another example (e.g. example 7) relates to a previously-described example (e.g. one or more of examples 1-6), further comprising: an impedance tuning stub coupled to the conductive disk.

Another example (e.g. example 8) relates to a previously-described example (e.g. one or more of examples 1-7), wherein the meander line monopole radiator coupled to the conductive disk at a first location, and further comprising: an impedance tuning stub coupled to the conductive disk at a second location that is offset 90 degrees from the first location.

Another example (e.g. example 9) relates to a previously-described example (e.g. one or more of examples 1-8), wherein the plurality of conductive side plates identified with the four closed sides of the cavity antenna include (i) a first set of conductive side plates identified with a first side from among the four closed sides of the cavity antenna, and (ii) a second set of conductive side plates identified with a second side from among the four closed sides of the cavity antenna, and wherein the first side of the cavity antenna and the second side of the cavity antenna are orthogonal to one another and to each of the conductive lower plate and the conductive upper plate.

Another example (e.g. example 10) relates to a previously-described example (e.g. one or more of examples 1-9), further comprising: a conductive tuning plate disposed in a same plane as the conductive disk, the conductive tuning plate comprising a plurality of conductive segments arranged outside a circle having a larger radius than that of the conductive disk.

An example (e.g. example 11) relates to an electronic device. The electronic device includes a housing; and a substrate integrated waveguide (SIW) cavity antenna disposed within the housing, the SIW cavity antenna including: a conductive disk coupled to an antenna feed; a conductive structure including (i) an upper plate, (ii) a lower plate that is parallel with the conductive upper plate, and (iii) a plurality of conductive side plates; wherein the conductive structure is identified with four closed sides of the cavity antenna, and wherein the cavity antenna is configured to transmit or receive electromagnetic energy in accordance with a first frequency band via two open sides of the cavity antenna.

Another example (e.g. example 12) relates to a previously-described example (e.g. example 11), wherein the electrically-conductive disk antenna is electrically insulated from the electrically-conductive structure.

Another example (e.g. example 13) relates to a previously-described example (e.g. one or more of examples 11-12), wherein the conductive disk has a center that is offset from a center of the conductive lower plate.

Another example (e.g. example 14) relates to a previously-described example (e.g. one or more of examples 11-13), wherein the center of the conductive disk identified with the SIW cavity antenna is offset from the center of the conductive lower plate in two directions that are orthogonal to one another.

Another example (e.g. example 15) relates to a previously-described example (e.g. one or more of examples 11-14), wherein the SIW cavity antenna further comprises:

a meander line monopole radiator coupled to the conductive disk and configured to enable the cavity antenna to further transmit or receive electromagnetic energy in accordance with a second frequency band.

Another example (e.g. example 16) relates to a previously-described example (e.g. one or more of examples 11-15), wherein the first frequency band comprises a frequency band of 5.15-7.125 GHz, and wherein the second frequency band comprises a frequency band of 2.40-2.49 GHz.

Another example (e.g. example 17) relates to a previously-described example (e.g. one or more of examples 11-16), wherein the SIW cavity antenna further comprises: an impedance tuning stub coupled to the conductive disk.

Another example (e.g. example 18) relates to a previously-described example (e.g. one or more of examples 11-17), wherein the meander line monopole radiator coupled to the conductive disk at a first location, the SIW cavity antenna further comprising: an impedance tuning stub coupled to the conductive disk at a second location that is offset 90 degrees from the first location.

Another example (e.g. example 19) relates to a previously-described example (e.g. one or more of examples 11-18), wherein the plurality of conductive side plates identified with the four closed sides of the cavity antenna include (i) a first set of conductive side plates identified with a first side from among the four closed sides of the cavity antenna, and (ii) a second set of conductive side plates identified with a second side from among the four closed sides of the cavity antenna, and wherein the first side of the cavity antenna and the second side of the cavity antenna are orthogonal to one another and to each of the conductive lower plate and the conductive upper plate.

Another example (e.g. example 20) relates to a previously-described example (e.g. one or more of examples 11-19), wherein the SIW cavity antenna further comprises: a conductive tuning plate disposed in a same plane as the conductive disk, the conductive tuning plate comprising a plurality of conductive segments arranged outside a circle having a larger radius than that of the conductive disk.

An example (e.g. example 21) relates to a cavity antenna. The cavity antenna includes a conductive disk means coupled to an antenna feeding means; a conductive means including (i) a conductive upper plate, (ii) a conductive lower plate that is parallel with the conductive upper plate, and (iii) a plurality of conductive side plates; wherein the conductive means forms four closed sides of the cavity antenna, and wherein the cavity antenna is configured to transmit or receive electromagnetic energy in accordance with a first frequency band via two open sides of the cavity antenna.

Another example (e.g. example 22) relates to a previously-described example (e.g. example 21), wherein the conductive disk means is electrically insulated from the conductive means.

Another example (e.g. example 23) relates to a previously-described example (e.g. one or more of examples 21-22), wherein the conductive disk means has a center that is offset from a center of the conductive lower plate.

Another example (e.g. example 24) relates to a previously-described example (e.g. one or more of examples 21-23), wherein the center of the conductive disk means is offset from the center of the conductive lower plate in two directions that are orthogonal to one another.

Another example (e.g. example 25) relates to a previously-described example (e.g. one or more of examples 21-24), further comprising: a meander line monopole means coupled to the conductive disk means and configured to enable the cavity antenna to further transmit or receive electromagnetic energy in accordance with a second frequency band.

Another example (e.g. example 26) relates to a previously-described example (e.g. one or more of examples 21-25), wherein the first frequency band comprises a frequency band of 5.15-7.125 GHz, and wherein the second frequency band comprises a frequency band of 2.40-2.49 GHz.

Another example (e.g. example 27) relates to a previously-described example (e.g. one or more of examples 21-26), further comprising: an impedance tuning means coupled to the conductive disk means.

Another example (e.g. example 28) relates to a previously-described example (e.g. one or more of examples 21-27), wherein the meander line monopole means coupled to the conductive disk means at a first location, and further comprising: an impedance tuning means coupled to the conductive disk means at a second location that is offset 90 degrees from the first location.

Another example (e.g. example 29) relates to a previously-described example (e.g. one or more of examples 21-28), wherein the plurality of conductive side plates identified with the four closed sides of the cavity antenna include (i) a first set of conductive side plates identified with a first side from among the four closed sides of the cavity antenna, and (ii) a second set of conductive side plates identified with a second side from among the four closed sides of the cavity antenna, and wherein the first side of the cavity antenna and the second side of the cavity antenna are orthogonal to one another and to each of the conductive lower plate and the conductive upper plate.

Another example (e.g. example 30) relates to a previously-described example (e.g. one or more of examples 21-29), further comprising: a conductive tuning plate disposed in a same plane as the conductive disk means, the conductive tuning plate comprising a plurality of conductive segments arranged outside a circle having a larger radius than that of the conductive disk means.

An example (e.g. example 31) relates to an electronic device. The electronic device includes a housing means; and a substrate integrated waveguide (SIW) cavity antenna disposed within the housing, the SIW cavity antenna including: a conductive disk means coupled to an antenna feeding means; a conductive means including (i) an upper plate, (ii) a lower plate that is parallel with the conductive upper plate, and (iii) a plurality of conductive side plates; wherein the conductive means is identified with four closed sides of the cavity antenna, and wherein the cavity antenna is configured to transmit or receive electromagnetic energy in accordance with a first frequency band via two open sides of the cavity antenna.

Another example (e.g. example 32) relates to a previously-described example (e.g. example 31), wherein the conductive disk antenna is electrically insulated from the conductive means.

Another example (e.g. example 33) relates to a previously-described example (e.g. one or more of examples 31-32), wherein the conductive disk means has a center that is offset from a center of the conductive lower plate.

Another example (e.g. example 34) relates to a previously-described example (e.g. one or more of examples 31-33), wherein the center of the conductive disk means identified with the SIW cavity antenna is offset from the center of the conductive lower plate in two directions that are orthogonal to one another.

Another example (e.g. example 35) relates to a previously-described example (e.g. one or more of examples 31-34), wherein the SIW cavity antenna further comprises: a meander line monopole means coupled to the conductive disk means and configured to enable the cavity antenna to further transmit or receive electromagnetic energy in accordance with a second frequency band.

Another example (e.g. example 36) relates to a previously-described example (e.g. one or more of examples 31-35), wherein the first frequency band comprises a frequency band of 5.15-7.125 GHz, and wherein the second frequency band comprises a frequency band of 2.40-2.49 GHz.

Another example (e.g. example 37) relates to a previously-described example (e.g. one or more of examples 31-36), wherein the SIW cavity antenna further comprises: an impedance tuning means coupled to the conductive disk means.

Another example (e.g. example 38) relates to a previously-described example (e.g. one or more of examples 31-37), wherein the meander line monopole radiator means is coupled to the conductive disk means at a first location, the SIW cavity antenna further comprising: an impedance tuning means coupled to the conductive disk means at a second location that is offset 90 degrees from the first location.

Another example (e.g. example 39) relates to a previously-described example (e.g. one or more of examples 31-38), wherein the plurality of conductive side plates identified with the four closed sides of the cavity antenna include (i) a first set of conductive side plates identified with a first side from among the four closed sides of the cavity antenna, and (ii) a second set of conductive side plates identified with a second side from among the four closed sides of the cavity antenna, and wherein the first side of the cavity antenna and the second side of the cavity antenna are orthogonal to one another and to each of the conductive lower plate and the conductive upper plate.

Another example (e.g. example 40) relates to a previously-described example (e.g. one or more of examples 31-39), wherein the SIW cavity antenna further comprises: a conductive tuning plate disposed in a same plane as the conductive disk means, the conductive tuning plate comprising a plurality of conductive segments arranged outside a circle having a larger radius than that of the conductive disk means.

An apparatus as shown and described.

A method as shown and described.

CONCLUSION

The aforementioned description will so fully reveal the general nature of the implementation of the disclosure that others can, by applying knowledge within the skill of the art, readily modify and/or adapt for various applications such specific implementations without undue experimentation and without departing from the general concept of the present disclosure. Therefore, such adaptations and modifications are intended to be within the meaning and range of equivalents of the disclosed implementations, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

Each implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described.

The exemplary implementations described herein are provided for illustrative purposes, and are not limiting. Other implementations are possible, and modifications may be made to the exemplary implementations. Therefore, the specification is not meant to limit the disclosure. Rather, the scope of the disclosure is defined only in accordance with the following claims and their equivalents.

Throughout the drawings, it should be noted that like reference numbers are used to depict the same or similar elements, features, and structures, unless otherwise noted.

The terms "at least one" and "one or more" may be understood to include a numerical quantity greater than or equal to one (e.g., one, two, three, four, [ . . . ], etc.). The term "a plurality" may be understood to include a numerical quantity greater than or equal to two (e.g., two, three, four, five, [ . . . ], etc.).

The words "plural" and "multiple" in the description and in the claims expressly refer to a quantity greater than one. Accordingly, any phrases explicitly invoking the aforementioned words (e.g., "plural [elements]", "multiple [elements]") referring to a quantity of elements expressly refers to more than one of the said elements. The terms "group (of)", "set (of)", "collection (of)", "series (of)", "sequence (of)", "grouping (of)", etc., and the like in the description and in the claims, if any, refer to a quantity equal to or greater than one, i.e., one or more. The terms "proper subset", "reduced subset", and "lesser subset" refer to a subset of a set that is not equal to the set, illustratively, referring to a subset of a set that contains less elements than the set.

The phrase "at least one of" with regard to a group of elements may be used herein to mean at least one element from the group consisting of the elements. The phrase "at least one of" with regard to a group of elements may be used herein to mean a selection of: one of the listed elements, a plurality of one of the listed elements, a plurality of individual listed elements, or a plurality of a multiple of individual listed elements.

What is claimed is:

1. A cavity antenna, comprising:

a conductive disk coupled to an antenna feed;

a conductive structure including (i) a conductive upper plate, (ii) a conductive lower plate that is parallel with the conductive upper plate, and (iii) a plurality of conductive side plates, wherein the conductive structure forms four closed sides of the cavity antenna, and wherein the cavity antenna is configured to transmit or receive electromagnetic energy in accordance with a first frequency band via two open sides of the cavity antenna; and a meander line monopole radiator coupled to the conductive disk and configured to enable the cavity antenna to further transmit or receive electromagnetic energy in accordance with a second frequency band.

2. The cavity antenna of claim 1, wherein the conductive disk is electrically insulated from the conductive structure.

3. The cavity antenna of claim 1, wherein the conductive disk has a center that is offset from a center of the conductive lower plate.

4. The cavity antenna of claim 1, wherein a center of the conductive disk is offset from a center of the conductive lower plate in two directions that are orthogonal to one another.

5. The cavity antenna of claim 1, wherein the first frequency band comprises a frequency band of 5.15-7.125 GHZ, and wherein the second frequency band comprises a frequency band of 2.40-2.49 GHz.

6. The cavity antenna of claim 1, further comprising:

an impedance tuning stub coupled to the conductive disk.

7. The cavity antenna of claim 1, wherein the meander line monopole radiator is coupled to the conductive disk at a first location, and further comprising:

an impedance tuning stub coupled to the conductive disk at a second location that is offset 90 degrees from the first location.

8. The cavity antenna of claim 1, wherein the plurality of conductive side plates identified with the four closed sides of the cavity antenna include (i) a first set of conductive side plates identified with a first side from among the four closed sides of the cavity antenna, and (ii) a second set of conductive side plates identified with a second side from among the four closed sides of the cavity antenna.

9. The cavity antenna of claim 8, wherein the first side of the cavity antenna and the second side of the cavity antenna are orthogonal to one another and to each of the conductive lower plate and the conductive upper plate.

10. The cavity antenna of claim 1, further comprising:

a conductive tuning plate disposed in a same plane as the conductive disk, the conductive tuning plate comprising a plurality of conductive segments arranged outside a circle having a larger radius than that of the conductive disk.

11. An electronic device, comprising:

a housing; and a substrate integrated waveguide (SIW) cavity antenna disposed within the housing, the SIW cavity antenna including:

a conductive disk coupled to an antenna feed;

a conductive structure including (i) a conductive upper plate, (ii) a conductive lower plate that is parallel with the conductive upper plate, and (iii) a plurality of conductive side plates, wherein the conductive structure is identified with four closed sides of the cavity antenna, and wherein the SIW cavity antenna is configured to transmit or receive electromagnetic energy in accordance with a first frequency band via two open sides of the SIW cavity antenna; and a meander line monopole radiator coupled to the conductive disk and configured to enable the SIW cavity antenna to further transmit or receive electromagnetic energy in accordance with a second frequency band.

12. The electronic device of claim 11, wherein the conductive disk is electrically insulated from the conductive structure.

13. The electronic device of claim 11, wherein the conductive disk has a center that is offset from a center of the conductive lower plate.

14. The electronic device of claim 11, wherein a center of the conductive disk identified with the SIW cavity antenna is offset from a center of the conductive lower plate in two directions that are orthogonal to one another.

15. The electronic device of claim 11, wherein the first frequency band comprises a frequency band of 5.15-7.125 GHZ, and wherein the second frequency band comprises a frequency band of 2.40-2.49 GHz.

16. The electronic device of claim 11, wherein the SIW cavity antenna further comprises:

an impedance tuning stub coupled to the conductive disk.

17. The electronic device of claim 11, wherein the meander line monopole radiator is coupled to the conductive disk at a first location, the SIW cavity antenna further comprising:

an impedance tuning stub coupled to the conductive disk at a second location that is offset 90 degrees from the first location.

18. The electronic device of claim 11, wherein the plurality of conductive side plates identified with the four closed sides of the SIW cavity antenna include (i) a first set of conductive side plates identified with a first side from among the four closed sides of the SIW cavity antenna, and (ii) a second set of conductive side plates identified with a second side from among the four closed sides of the SIW cavity antenna.

19. The electronic device of claim 18, wherein the first side of the SIW cavity antenna and the second side of the SIW cavity antenna are orthogonal to one another and to each of the conductive lower plate and the conductive upper plate.

20. The electronic device of claim 11, wherein the SIW cavity antenna further comprises:

a conductive tuning plate disposed in a same plane as the conductive disk, the conductive tuning plate comprising a plurality of conductive segments arranged outside a circle having a larger radius than that of the conductive disk.

* * * * *